United States Patent
Kim et al.

(10) Patent No.: US 12,051,919 B2
(45) Date of Patent: Jul. 30, 2024

(54) WIRELESS POWER STATION AND CONTROL METHOD THEREOF

(71) Applicant: Samsung Electronics Co., Ltd., Suwon-si (KR)

(72) Inventors: Mukyong Kim, Suwon-si (KR); Sangjin Jeong, Suwon-si (KR); Mijo Kang, Suwon-si (KR); Sunjin Kim, Suwon-si (KR); Kyungah Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 17/454,151

(22) Filed: Nov. 9, 2021

(65) Prior Publication Data

US 2022/0140661 A1    May 5, 2022

Related U.S. Application Data

(63) Continuation of application No. PCT/KR2021/015629, filed on Nov. 2, 2021.

(30) Foreign Application Priority Data

Nov. 4, 2020  (KR) .......................... 10-2020-0145991

(51) Int. Cl.
*H02J 50/90* (2016.01)
*H02J 50/12* (2016.01)
(Continued)

(52) U.S. Cl.
CPC .............. *H02J 50/90* (2016.02); *H02J 50/12* (2016.02); *H02J 50/402* (2020.01); *H02J 50/80* (2016.02); *A47J 27/2105* (2013.01)

(58) Field of Classification Search
None
See application file for complete search history.

(56) References Cited

U.S. PATENT DOCUMENTS 11,165,273 B2    11/2021    Graham et al.
11,445,579 B2     9/2022    Park et al.
(Continued)

FOREIGN PATENT DOCUMENTS

CN    102647030 A    8/2012
EP      2453715 A2    5/2012
(Continued)

OTHER PUBLICATIONS

International Search Report and Written Opinion of the International Searching Authority in connection with International Application No. PCT/KR2021/015629 issued Feb. 28, 2022, 9 pages.
(Continued)

*Primary Examiner* — Daniel Kessie

(57) ABSTRACT

A power station includes: a plate, a coil below the plate, an inverter configured to supply alternating current power to the coil, a communication module including an antenna and configured to transmit and receive radio signals through the antenna, a display, and a controller configured to control the communication module to communicate with an external device placed on the plate and control the inverter to wirelessly transmit power to the external device through the coil. The controller may control the display to display information indicating whether the external device is aligned with the coil based on a radio signal received from the external device through the antenna.

15 Claims, 22 Drawing Sheets

(51) Int. Cl.
*H02J 50/40* (2016.01)
*H02J 50/80* (2016.01)
*A47J 27/21* (2006.01)

(56) References Cited

U.S. PATENT DOCUMENTS

| | | | |
|---|---|---|---|
| 2013/0093259 A1* | 4/2013 | Hente | B60L 53/38 |
| | | | 307/104 |
| 2014/0132210 A1* | 5/2014 | Partovi | H02J 50/90 |
| | | | 320/108 |
| 2016/0294219 A1 | 10/2016 | van Wageningen et al. | |
| 2017/0194817 A1* | 7/2017 | Takatsu | B60L 53/126 |
| 2018/0263084 A1 | 9/2018 | Yoshino et al. | |
| 2019/0006886 A1* | 1/2019 | Bando | H02M 7/5387 |
| 2019/0074724 A1* | 3/2019 | Wittenberg | H01F 27/366 |
| 2020/0260899 A1 | 8/2020 | Nam et al. | |
| 2020/0260900 A1 | 8/2020 | Kim et al. | |
| 2020/0260902 A1 | 8/2020 | Nam et al. | |
| 2020/0267806 A1 | 8/2020 | Nam et al. | |
| 2021/0273493 A1* | 9/2021 | Davoine-Rondon | H02J 50/10 |

FOREIGN PATENT DOCUMENTS

| | | |
|---|---|---|
| JP | 6786712 B2 | 11/2020 |
| JP | 2022072731 A | 5/2022 |
| KR | 10-1404017 B1 | 6/2014 |
| KR | 10-2016-0096397 A | 8/2016 |
| KR | 10-1743071 B1 | 6/2017 |
| KR | 10-2018-0000494 A | 1/2018 |
| KR | 20180081639 A | 7/2018 |
| KR | 20200009991 A | 1/2020 |
| KR | 20200021403 A | 2/2020 |
| KR | 20200101805 A | 8/2020 |
| KR | 20200101825 A | 8/2020 |
| KR | 20200101826 A | 8/2020 |
| KR | 20200101827 A | 8/2020 |
| KR | 20210085134 A | 7/2021 |
| WO | 2018024913 A1 | 2/2018 |
| WO | 2020171418 A1 | 8/2020 |

OTHER PUBLICATIONS

Supplementary European Search Report dated Jan. 9, 2024, in connection with European Patent Application No. 21889493.9, 8 pages.

* cited by examiner

FIG. 16
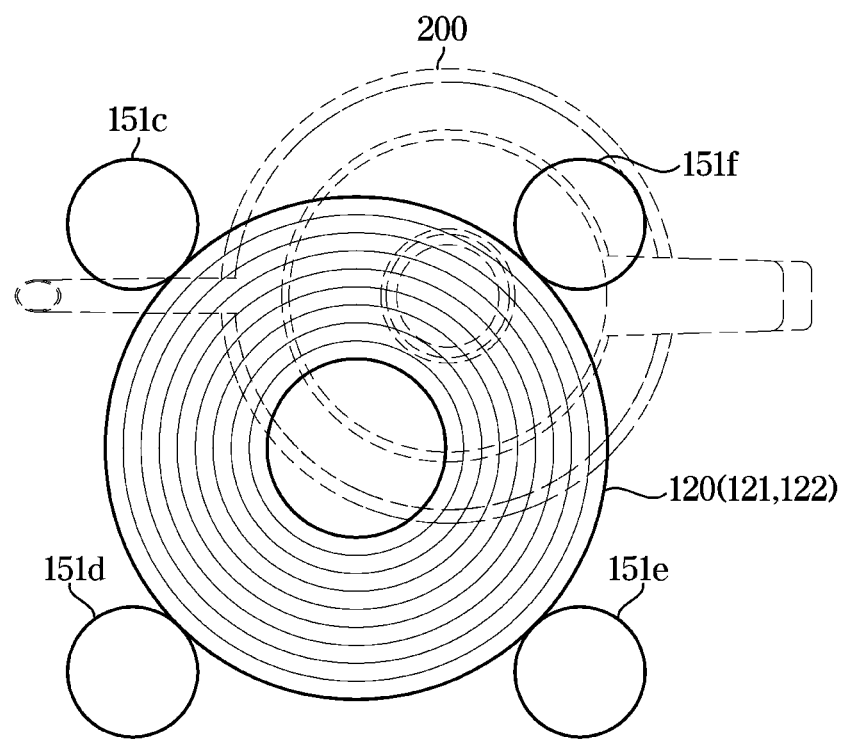
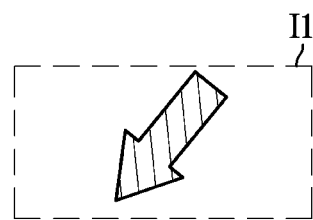

WIRELESS POWER STATION AND CONTROL METHOD THEREOF

CROSS-REFERENCE TO RELATED APPLICATIONS

This application is a Bypass Continuation of International Application No. PCT/KR2021/015629, filed Nov. 2, 2021, which claims priority to Korean Patent Application No. 10-2020-0145991, filed Nov. 4, 2020, the disclosures of which are herein incorporated by reference in their entirety.

BACKGROUND

1. Field

The present application is directed to a wireless power station and a control method thereof, and particularly, to a wireless power station capable of identifying whether a power transmission object is aligned therewith and a control method thereof.

2. Description of Related Art

Recently, technologies for not only wireless communication but also wireless power transmission for wirelessly transmitting power are actively being studied.

In wireless power transmission, power is wirelessly transmitted from a transmitting device to a receiving device according to a magnetic correlation between a transmitting coil of the transmitting device and a receiving coil of the receiving device.

It is known that generally, the efficiency of wireless power transmission is lower than that of wired power transmission. Particularly, it is known that the efficiency of wireless power transmission varies largely according to a relative positional relationship between the transmitting coil and the receiving coil.

To improve the efficiency of wireless power transmission, a magnetic field generated by the transmitting coil should be linked to an inner side of the receiving coil. To link the magnetic field to the inner side of the receiving coil, a center of the transmitting coil and a center of the receiving coil should be aligned with each other.

In the related art, a method of marking a reference position on a transmitting device at which a receiving device is to be positioned or the method of providing a transmitting device with a structure for alignment with a receiving device is used.

However, this method is disadvantageous in that the appearance of the transmitting device is impaired and a use of the transmitting device is limited.

SUMMARY

An aspect of the present disclosure provides a power station capable of identifying whether an electric device is aligned therewith when the electric device is placed on the power station, and a control method thereof.

An aspect of the present disclosure provides a power station capable of identifying whether an electric device is aligned therewith through communication with the electric device during transmission of power to the electric device, and a control method thereof.

An aspect of the present disclosure provides a power station capable of transmitting a message to a user's user device when an electric device is not aligned with the power station, and a control method thereof.

According to an aspect of the present disclosure, a power station includes a plate, a coil below the plate, an inverter configured to supply alternating current power to the coil, a communication module including an antenna and configured to transmit and receive radio signals through the antenna, a display, and a controller configured to control the communication module to communicate with an external device placed on the plate and control the inverter to wirelessly supply power to the external device through the coil. The controller may control the display to display information indicating whether the external device is aligned with the coil based on a radio signal received from the external device through the antenna.

According to an aspect of the present disclosure, a control method of a power station, which includes a plate and a coil below the plate, includes communicating with an external device placed on the plate, displaying whether the external device is aligned with the coil based on a radio signal received from the external device through an antenna, and wirelessly supplying power to the external device through the coil.

According to an aspect of the present disclosure, a power station includes: a plate, a coil below the plate, an inverter configured to supply alternating current power to the coil, a communication module including an antenna and configured to transmit and receive radio signals through the antenna, a display, and a controller configured to control the communication module to communicate with an external device placed on the plate and control the inverter to wirelessly supply power to the external device through the coil. The controller may control the display to display information indicating whether the external device is aligned with the coil based on the amount of power received by the external device.

According to an aspect of the present disclosure, a power station is capable of identifying whether an electric device is aligned therewith when the electric device is placed on the power station. Accordingly, the power station can allow a user to position the electric device at an optimal power transmission position.

According to an aspect of the present disclosure, a power station is capable of identifying whether an electric device is aligned therewith through communication with the electric device during transmission of power to the electric device. Accordingly, the power station can allow a user to position the electric device at an optimal power transmission position when the electric device is moving during an operation of the power station.

According to an aspect of the present disclosure, a power station is capable of transmitting a message to a user's user device when an electric device is not aligned with the power station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 16 illustrates an example in which a power station is not aligned with an electric device according to an embodiment.

DETAILED DESCRIPTION

Figure 1:
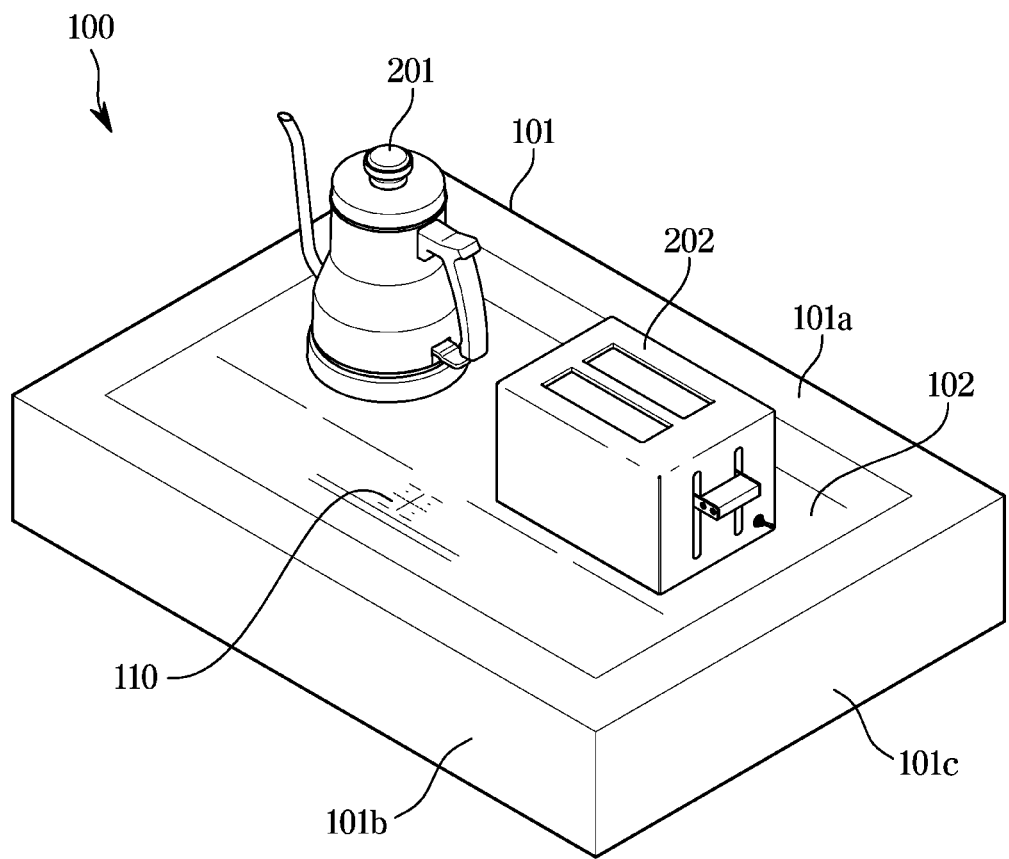
FIG. 1 illustrates an appearance of a wireless power station according to an embodiment.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The same reference numerals refer to the same elements throughout the specification. The present specification does not describe all elements of embodiments, and a description of general matters in the technical field to which the present disclosure pertain or the same matters in the embodiments will be omitted herein. Terms such as "unit," "module," "member," and "block" used herein may be embodied as software or hardware components, and in some embodiments, a plurality of units, modules, members, or blocks may be embodied together as one component or one unit, module, member or block may include a plurality of components.

Throughout the specification, when an element is referred to as being "connected to" another element, the element should be understood as being connected directly or indirectly to the other element or the indirect connection should be understood to include connection through a wireless communication network.

It will be understood that when an element is referred to as "including" another element, the element may further include other elements rather than excluding the other components unless described otherwise.

Throughout the present specification, when an element is referred to as being "on" another element, it should be understood that the element is in contact with the other element or another element is present therebetween.

Terms such as first and second are used to distinguish one component from another component and components are not limited by these terms.

As used herein, the singular expressions are intended to include plural forms as well, unless the context clearly dictates otherwise.

Reference numerals assigned to operations are used only for convenience of description rather than describing an order of the operations and thus these operations may be performed in an order different from that described above unless the context indicates a specific order.

Hereinafter, a principle of operation of the present disclosure and embodiments thereof will be described with reference to the accompanying drawings.

Figure 2:
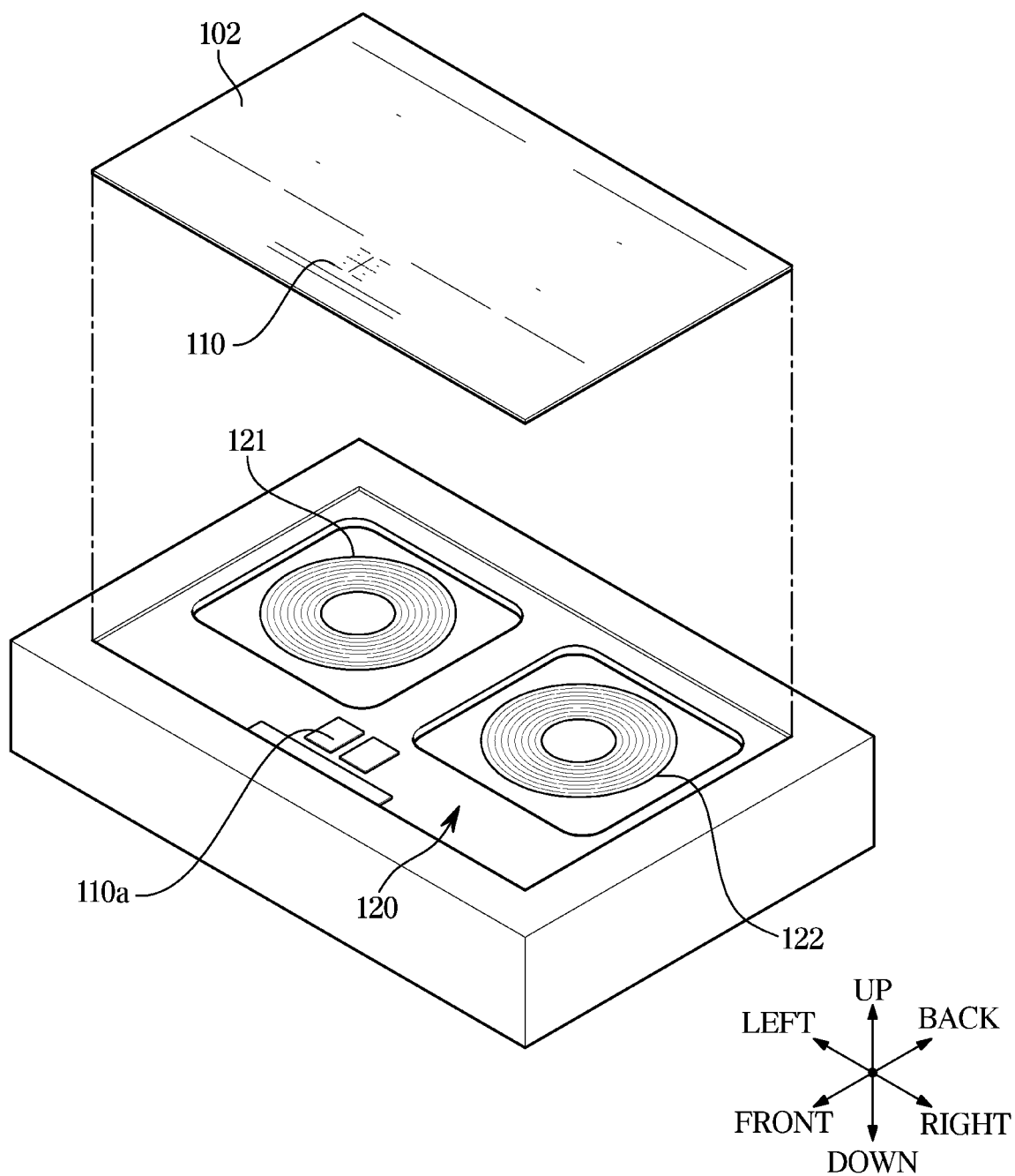
FIG. 2 illustrates an inside of a wireless power station according to an embodiment.
Figure 3:
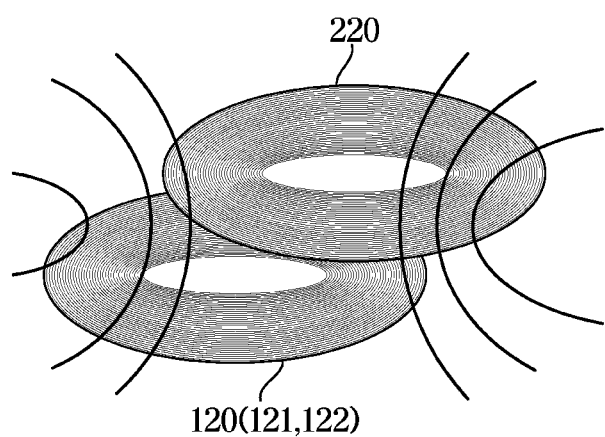
FIG. 3 illustrates an example in which a wireless power station transmits power according to an embodiment.

FIG. 1 illustrates an appearance of a wireless power station according to an embodiment. FIG. 2 illustrates an inside of a wireless power station according to an embodiment. FIG. 3 illustrates an example in which a wireless power station transmits power according to an embodiment.

As shown in FIG. 1, a power station 100 includes a main body 101 which forms an appearance of the power station 100 and in which various components of the power station 100 are installed.

On the main body 101, electric devices 201 and 202 may be placed. The electric devices 201 and 202 may be devices capable of wirelessly receiving power from the power station 100. For example, the electric devices 201 and 202 may be small household electric appliances, such as an electric kettle, a blender, a toaster, an electric oven, a coffee maker, etc., which may be placed on the main body 101 of the power station 100.

An upper surface 101a of the main body 101 is provided with an upper plate 102 having a flat shape on which the electric devices 201 and 202 may be placed.

A control panel 110 may be provided at a side of the upper plate 102 to receive a control command from a user and display operational information of the power station 100. However, the control panel 110 is not limited to being positioned on the upper plate 102 and may be provided at various locations such as a front surface 101b and/or a side surface 101c of the main body 101.

As shown in FIG. 2, a plurality of transmitting coils 121 and 122 (i.e., transmitting coils 120) for supplying power to the electric devices 201 and 202 and a circuit board assembly 110a implementing the control panel 110 may be provided below the upper plate 102.

Each of the plurality of transmitting coils 121 and 122 may include a wire wound in a roughly helical structure or a spiral form. For example, the transmitting coil 120 may be formed in a helical structure such that wires are spaced substantially the same distance from each other with respect to a central axis or may be formed spirally such that wires are located on the same plane with respect to a central point.

The transmitting coil 120 may generate a magnetic field, an electric field, and/or an electromagnetic field to wirelessly supply power to the electric devices 201 and 202.

For example, when a drive current is supplied to the transmitting coil 120 as shown in FIG. 3, a magnetic field B may be induced near the transmitting coil 120. Particularly, when a current which changes in strength and direction over time, i.e., an alternating current, is supplied to the transmitting coil 120, a magnetic field B that changes in strength and direction over time may be induced near the transmitting coil 120.

The magnetic field B induced near the transmitting coil 120 may pass through the upper plate 102 and reach the electric devices 201 and 202 on the upper plate 102.

Each of the electric devices 201 and 202 may include a receiving coil 220 to receive power wirelessly. The receiving coil 220 may also include a wire wound in a roughly helical structure or a roughly spiral form.

The magnetic field B generated by the transmitting coil 120 may pass through an inner side of the receiving coil 220 as shown in FIG. 3. A current (hereinafter referred to as an "induced current") may be induced to the receiving coil 220 due to the magnetic field B that changes in intensity and direction over time. As such, a phenomenon that an induced current generated due to the magnetic field B changes over time is referred to as an electromagnetic induction phenomenon.

Due to the induced current, the receiving coil 220 may generate an electromotive force causing a current to flow. Due to the electromotive force of the receiving coil 220, power may be supplied to the electric devices 201 and 202, thus operating the electric devices 201 and 202.

As described above, power may be wirelessly transmitted to the receiving coils 220 of the electric devices 01 and 202 through the plurality of transmitting coils 121 and 122 using the electromagnetic induction phenomenon.

The plurality of transmitting coils 121 and 122 may be aligned in a predetermined pattern below the upper plate 102. For example, the plurality of transmitting coils 121 and 122 may be arranged in a matrix of rows and columns. In other words, the plurality of transmitting coils 121 and 122 may be arranged at a predetermined interval from a front side of the main body 101 to a rear side thereof and arranged at a predetermined interval from a right side of the main body 101 to a left side thereof.

The plurality of transmitting coils 121 and 122 may include a first transmitting coil 121 and a second transmitting coil 122, and the first transmitting coil 121 and the second transmitting coil 122 may be arranged in the same row with respect to a front side of the power station 100. However, the arrangement of the plurality of transmitting coils 121 and 122 is not limited to that shown in FIG. 2, and the plurality of transmitting coils 121 and 122 may be arranged in various forms. For example, the first transmitting coil 121 and the second transmitting coil 122 may be arranged in the same column with respect to the front side of the power station 100.

The circuit board assembly 110a implementing the control panel 110 may be provided below the control panel 110 located at a side of the upper plate 102. The circuit board assembly 110a may be a printed board assembly (PBA) including a printed circuit board (PCB) on which a display, a switch element, an integrated circuit element, etc. implementing the control panel 110 are installed.

A position of the circuit board assembly 110a is not limited to that shown in FIG. 2 and may be disposed at various positions. For example, when the control panel 110 is installed on the front surface 101b of the main body 101, the circuit board assembly 110a may be disposed behind the front surface 101b of the main body 101.

A printed circuit board assembly (not shown) for driving the plurality of transmitting coils 121 and 122 may be provided below the plurality of transmitting coils 121 and 122. A driving circuit for supplying a drive current to the plurality of transmitting coils 121 and 122, a control circuit for controlling operations of the plurality of transmitting coils 121 and 122, and the like may be provided on a plurality of printed circuit board assemblies.

As described above, the power station 100 may include the plurality of transmitting coils 121 and 122 for wirelessly transmitting power to the electric devices 201 and 202, the driving circuit for operating the plurality of transmitting coils 121 and 122, and the control circuit.

Similarly, the electric devices 201 and 202 may include the receiving coil 220 for wirelessly receiving power from the power station 100, a receiving circuit for processing power received through the receiving coil 220, and a control circuit.

Configurations of the power station 100 and the electric devices 201 and 202 will be briefly described below.

Figure 4:
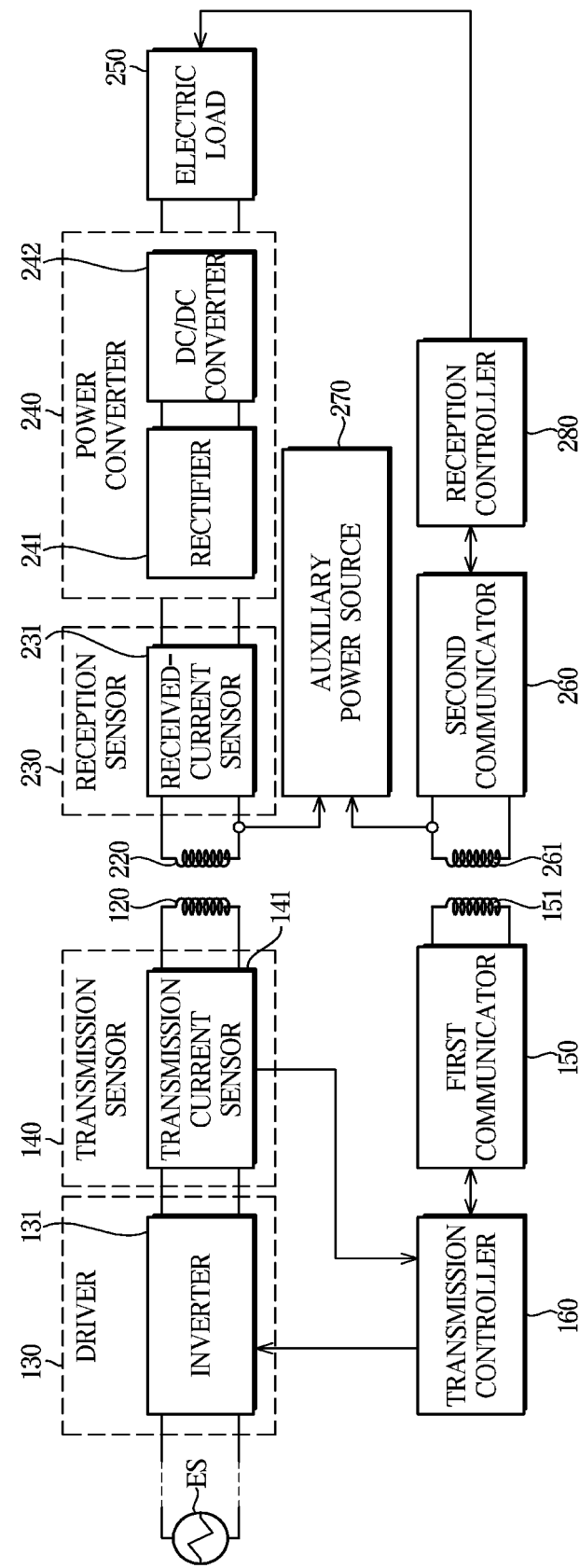
FIG. 4 schematically illustrates configurations of a wireless power station and an electric device according to an embodiment.

FIG. 4 schematically illustrates configurations of a wireless power station and an electric device according to an embodiment.

As shown in FIG. 4, a power station 100 includes a transmitting coil 120, a driver 130, a transmission sensor 140, a first communicator 150, and a transmission controller 160. Electric devices 201 and 202 each include a receiving coil 220, a reception sensor 230, a power converter 240, an electric load 250, a second communicator 260, an auxiliary power source 270, and a reception controller 280.

The transmitting coil 120 of the power station 100 may convert electric energy into electromagnetic and/or magnetic energy. In other words, the transmitting coil 120 may be supplied with an alternating current (an alternating current electric field) and generate an alternating current magnetic field.

The transmitting coil 120 is magnetically correlated with the receiving coils 220 of the electric devices 201 and 202. For example, the transmitting coil 120 and the receiving coil 220 may be arranged such that an electric field generated by the transmitting coil 120 may pass through the receiving coil 220. The transmitting coil 120 and the receiving coil 220 may be formed spirally on a plane, and a central axis of the transmitting coil 120 and a central axis of the receiving coil 220 may substantially coincide.

The power station 100 may further include a resonant capacitor that electrically resonates with the transmitting coil 120. Due to a resonance between the resonant capacitor and the transmitting coil 120, the transmitting coil 120 may operate at a frequency for efficiently transmitting power and the efficiency of power transmission by the transmitting coil 120 may be improved.

The power station 100 may further include a ferrite element to improve the efficiency of power transmission using a magnetic field B between the transmitting coil 120 and the receiving coil 220. The ferrite element may guide a magnetic field generated by the transmitting coil 120 toward the electric devices 201 and 202 and block a leaking magnetic field.

The power station 100 may further include an impedance matching circuit to improve the efficiency of power transmission between the transmitting coil 120 and the driver 130.

The driver 130 may receive power from an external power source ES and supply a current to the transmitting coil 120 so that power may be wirelessly transmitted through the transmitting coil 120 under control of the transmission controller 160.

The driver 130 includes an inverter 131. The inverter 131 may include a switch circuit for converting power received from the external power source ES into alternating current power of a predetermined frequency. For example, the inverter 131 may provide the transmitting coil 120 with an alternating current that changes in intensity and direction. In addition, the inverter 131 may change an intensity and/or frequency of an output current to adjust the amount of power to be transmitted from the transmitting coil 120 to the receiving coil 220.

The transmission sensor 140 includes a transmission current sensor 141 for sensing a drive current supplied to the transmitting coil 120 from the inverter 131. For example, the transmission current sensor 141 may include a shunt resistor and measure a potential difference between opposite ends of the shunt resistor. As another example, the transmission current sensor 141 may include a hall sensor and measure a magnetic field due to a current.

The transmission current sensor 141 may provide the transmission controller 160 with an electric signal (e.g., the potential difference between the opposite ends of the shunt resistor or output code of the hall sensor) corresponding to a measured current. The transmission controller 160 may identify the intensity of a drive current supplied to the transmitting coil 120, based on an output signal of the transmission current sensor 141, and calculate the amount of power wirelessly transmitted to the electric devices 201 and 202 through the transmitting coil 120.

The first communicator 150 may communicate with the electric devices 201 and 202. The first communicator 150 may include a transmission antenna 151 provided separately from the transmitting coil 120 and wirelessly transmit data to or receive data from the second communicators 260 of the electric devices 201 and 202 through the transmission antenna 151. For example, for communication efficiency, the transmission antenna 151 may be formed at an inner or outer side of the transmitting coil 120 to be concentrically positioned with the transmitting coil 120.

The first communicator 150 may wirelessly transmit data to or receive data from the second communicator 260 according to various wireless communication standards. For example, the first communicator 150 may wirelessly transmit data to or receive data from the second communicator 260 using wireless local area network (LAN) communication or short-range wireless communication.

The transmission controller 160 may control the driver 130 to wirelessly supply power to the electric devices 201 and 202 based on communication data received from the electric devices 201 and 202 through the first communicator 150.

For example, the transmission controller 160 may identify the electric devices 201, and 202 based on the communication data received through the first communicator 150. The transmission controller 160 may receive a request related to power transmission from the electric devices 201 and 202 through the first communicator 150 and control the driver 130 to adjust an output of the transmitting coil 120 in response to the received request.

In addition, the transmission controller 160 may achieve power transmission efficiency according to the communication data received through the first communicator 150 and identify whether the transmitting coil 120 and the receiving coil 220 are aligned with each other based on wireless power transmission efficiency. For example, the transmission controller 160 may identify whether the electric devices 201 and 202 are located at a reference position for alignment of the transmitting coil 120 and the receiving coil 220.

The receiving coils 220 of the electric devices 201 and 202 may convert electromagnetic and/or magnetic energy into electric energy. In other words, the receiving coil 220 may provide an alternating current (an alternating current electric field) in response to an alternating current magnetic field.

The receiving coil 220 is magnetically correlated with the transmitting coil 120 of the power station 100. The receiving coil 220 may output an alternating current and an alternating current voltage from an alternating current magnetic field generated by the transmitting coil 120.

The electric devices 201 and 202 may further include a resonant capacitor that electrically resonates with the receiving coil 220. Due to a resonance between the resonant capacitor and the receiving coil 220, the receiving coil 220 may operate at a frequency for efficiently receiving power and the efficiency of power reception by the receiving coil 220 may be improved.

The electric devices 201 and 202 may further include a ferrite element to improve the efficiency of power reception using a magnetic field B between the transmitting coil 120 and the receiving coil 220. The ferrite element may guide a magnetic field generated by the power station 100 toward the receiving coil 220 and block a leaking magnetic field.

The electric devices 201 and 202 may further include an impedance matching circuit to improve the efficiency of power transmission between the receiving coil 220 and the power converter 240.

The reception sensor 230 includes a received-current sensor 231 for detecting a received current supplied to the power converter 240 from the receiving coil 220. For example, the received-current sensor 231 may measure a potential difference between opposite ends of the shunt resistor or measure a magnetic field due to a current.

The received-current sensor 231 may supply an electric signal (e.g., the potential difference between the opposite ends of the shunt resistor or output code of the hall sensor) corresponding to a measured current to the reception controller 280. The reception controller 280 may identify the intensity of a current output from the receiving coil 220 based on an output signal of the received-current sensor 231 and calculate the amount of power received from the power station 100 through the receiving coil 220.

The power converter 240 may receive alternating current power from the receiving coil 220 and convert the alternating current power into direct-current (DC) power under control of the reception controller 280. The power converter 240 includes a rectifier 241 and a DC/DC converter 242.

The rectifier 241 may include a diode bridge that rectifies alternating current power received through the receiving coil 220. For example, the rectifier 241 may convert an alternating current voltage, which changes in direction and intensity, into a rectified voltage, which is constant in direction. The rectifier 241 may include a DC link capacitor to constantly stabilize the magnitude of a rectified voltage.

The DC/DC converter 242 may change a voltage of power rectified/stabilized by the rectifier 241. The DC/DC converter 242 may convert, for example, a voltage of power output from the rectifier 241 to match either a rated voltage of the electric load 250 or a rated voltage of the second communicator 260 and/or the reception controller 280.

In some cases, the power converter 240 may be omitted. For example, when the electric load 250 generates only heat, alternating current power of the receiving coil 220 may be supplied directly to the electric load 250.

On the other hand, when the electric load 250 includes, for example, a motor, a light-emitting diode or the like, the alternating current power of the receiving coil 220 is not available for the electric load 250. In this case, the power converter 240 is required.

The electric load 250 may be configured to convert electric energy into heat, light, and/or kinetic energy (rotational and/or translational energy). In addition, the electric load 250 may be configured to store electric energy. For example, the electric load 250 may include a light-emitting diode for heating an object or emitting light to the object, a motor for rotating an object, a battery for storing electric energy, or the like.

The electric load 250 may have various electrical properties according to the type thereof. For example, a heater may act as an electrical resistance and a motor may act as an inductor. A battery may act as a capacitor.

The second communicator 260 may communicate with the power station 100. The second communicator 260 may include a reception antenna 261 provided separately from the receiving coil 220 and wirelessly transmit data to or receive data from the first communicator 150 of the power station 100 through the reception antenna 261. For example, for communication efficiency, the reception antenna 261 may be formed at an inner or outer side of the receiving coil 220 to be concentrically positioned with the receiving coil 220.

The second communicator 260 may wirelessly transmit data to or receive data from the first communicator 150 using a communication standard such as a wireless LAN or short-range wireless communication.

The auxiliary power source 270 may supply power to the reception controller 280 and the second communicator 260 when power cannot be supplied to the electric devices 201 and 202 from the power station 100 so that the electric devices 201 and 202 may be supplied with power from the power station 100.

For example, the auxiliary power source 270 may include a battery. The auxiliary power source 270 may collect power by receiving a low-power radio signal, which is emitted through an antenna of the first communicator 150, through an antenna of the second communicator 260 so that the power station 100 may search for the electric devices 201 and 202. Alternatively, the auxiliary power source 270 may collect power by receiving a low-magnitude magnetic field, which is emitted through the transmitting coil 120, through the receiving coil 220 so that the power station 100 may search for the electric devices 201 and 202.

The auxiliary power source 270 may provide the reception controller 280 and/or the second communicator 260 with power stored in the battery or power collected through the antenna/receiving coil 220.

The reception controller 280 and/or the second communicator 260 may operate using power provided from the auxiliary power source 270 when power cannot be supplied to the electric devices 201 and 202 from the power station 100.

The reception controller 280 may control the power converter 240 to receive power wirelessly from the power station 100. For effective power transmission, the reception controller 280 may provide the power station 100 with information including the amount of power received from the power station 100 and/or the intensity of a wireless communication signal received from the power station 100.

The reception controller 280 may control the electric load 250 to provide a service in response to a user input while power is received stably from the power station 100.

As such, the power station 100 may wirelessly supply power to the electric devices 201 and 202. In addition, the power station 100 may identify whether the receiving coils 220 of the electric devices 201 and 202 are aligned with the transmitting coil 120. For example, the transmission controller 160 may identify whether the electric devices 201 and 202 are located at a reference position for alignment of the transmitting coil 120 and the receiving coil 220.

The components of the power station 100 and the functions thereof will be described in more detail below.

Figure 5:
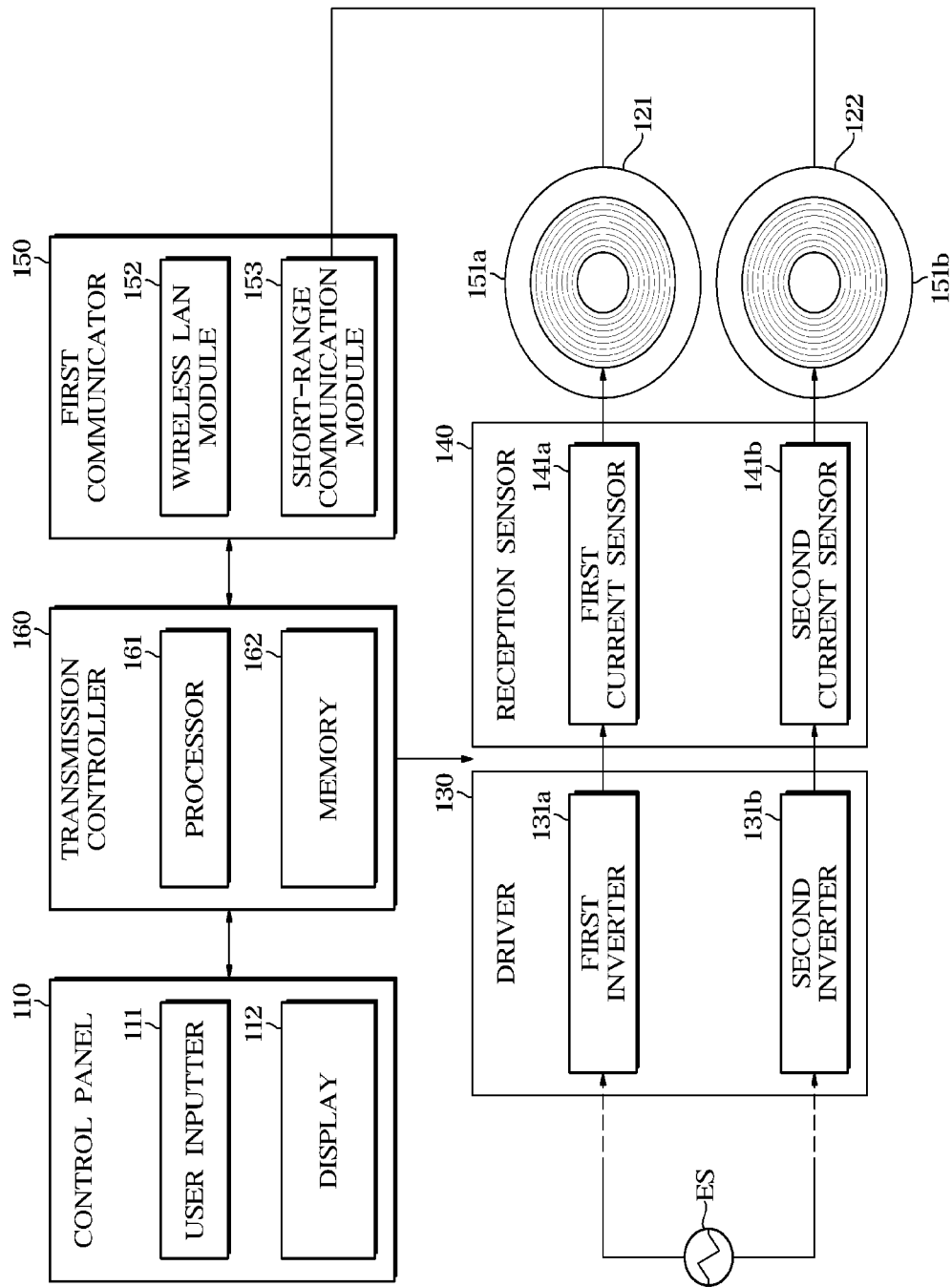
FIG. 5 illustrates a configuration of a wireless power station according to an embodiment.
Figure 6:
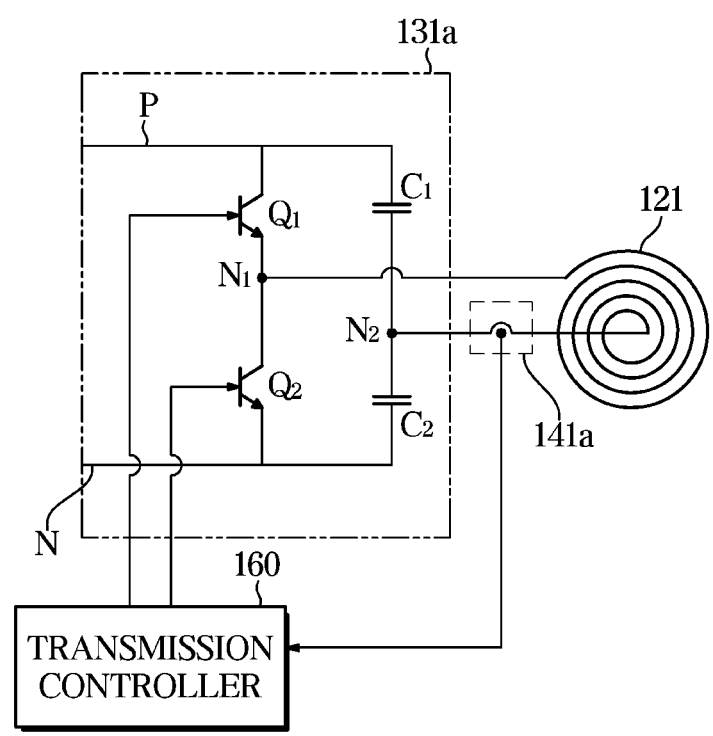
FIG. 6 illustrates examples of a first inverter and a first transmitting coil illustrated in FIG. 5.

FIG. 5 illustrates a configuration of a wireless power station according to an embodiment. FIG. 6 illustrates examples of a first inverter and a first transmitting coil illustrated in FIG. 5.

As shown in FIG. 5, a power station 100 includes a control panel 110, a plurality of transmitting coils 121 and 122, a driver 130, a transmission sensor 140, a first communicator 150, and a transmission controller 160.

The control panel 110 may include a user inputter 111 for receiving a control command from a user, and a display 112 displaying an image relating to an operation of the power station 100.

The user inputter 111 may include an input button for receiving a predetermined control command, a touch pad for receiving various control commands according to an image displayed on the display 112, and the like. The touch pad may receive a touch input from a user and transmit coordinates of the received touch input to the transmission controller 160. The transmission controller 160 may identify a control command from a user based on the coordinates of the touch input.

The input button may include a plurality of buttons for receiving a predetermined control command from a user and transmitting an electrical signal corresponding to the control command to the transmission controller 160. For example, the input button may include an operation button for receiving a command to power on/off the power station 100, a power-up button and a power-off button for receiving information about a magnitude of electromagnetic fields and/or magnetic fields output from coils 120 of the power station 100, and the like.

The input button may be embodied as various types of buttons (or switches). For example, the input button may be embodied as a push button, a slide button, a toggle button, a touch button, a dial, or the like.

The display 112 may display an image relating to an operation of the power station 100. For example, the display 112 may display an image indicating whether the coils 120 of the power station 100 are being operated, magnetic fields output from the coils 120 and/or the intensity of an electromagnetic field, and the like.

The display 112 may include various types of display means. The display 112 may include, for example, a light-emitting diode (LED), a liquid crystal display, or an organic light-emitting diode (OLED), or the like.

The user inputter 111 and the display 112 may be integrally formed. For example, a touch pad and a display may be integrally formed as a touch screen panel (TSP). The display displays an image for receiving a touch input from a user and the touch pad may receive the touch input. The transmission controller 160 may identify a control command from a user based on the coordinates of the touch input.

As such, the control panel 110 may receive a control command from a user and transmit an electrical signal corresponding to the control command from the user to the transmission controller 160. In addition, the control panel 110 may receive information about an operation of the power station 100 from the transmission controller 160 and display an image indicating the operation of the power station 100.

When the power station 100 is placed on an upper plate 102, each of a plurality of transmitting coils 121 and 122 may generate a magnetic field and/or an electromagnetic field for providing power to the power station 100.

The plurality of transmitting coils 121 and 122 may include a first transmitting coil 121 and a second transmitting coil 122 as described above, and the first transmitting coil 121 and the second transmitting coil 122 may be arranged in parallel at left and right sides of the upper plate 102.

The driver 130 may be supplied with power from an external power source ES and supply a drive current to the plurality of transmitting coils 121 and 122 according to a driving control signal from the transmission controller 160. Specifically, the driver 130 may apply an alternating current voltage to the plurality of transmitting coils 121 and 122 according to a control signal from the transmission controller 160 and output an alternating current (drive current).

The driver 130 includes a first inverter 131a and a second inverter 131b.

The first and second inverters 131a and 131b may apply an alternating current voltage to the first and second transmitting coils 121 and 122 and supply an alternating current thereto. The first inverter 131a may supply a drive current to the first transmitting coils 121, and the second inverter 131b may supply a drive current to the second transmitting coil 122.

As shown in FIG. 6, the first inverter 131a may be connected to the first transmitting coil 121.

The first inverter 131a may include a first inverter switch Q1 and a second inverter switch Q2 to supply a drive current to the first transmitting coil 121 or prevent the supply of the drive current to the first transmitting coil 121, and a first resonant capacitor C1 and a second resonant capacitor C2 that resonate with the first transmitting coil 121.

One end of the first inverter switch Q1 may be connected to a positive terminal P, one end of the second inverter switch Q2 may be connected to a negative terminal N, and another end of the first inverter switch Q1 may be connected to another end of the second inverter switch Q2. In other words, the first inverter switch Q1 and the second inverter switch Q2 may be connected in series between the positive terminal P and the negative terminal N.

The first inverter switch Q1 and the second inverter switch Q2 may be turned on/off at a high speed of 10 kHz (kilohertz) to 100 kHz and may include a 3-terminal semiconductor device switch with a high response speed. For example, the first inverter switch Q1 and the second inverter switch Q2 may each include a bipolar junction transistor (BJT), a metal-oxide semiconductor field-effect transistor (MOSFET), an insulated gate bipolar transistor (IGBT), a thyristor, and the like.

One end of the first resonant capacitor C1 may be connected to the positive terminal P, one end of the second resonant capacitor C2 may be connected to the second negative terminal N, and another end of the first resonant capacitor C1 may be connected to another end of the second resonant capacitor C2. In other words, the first resonant capacitor C1 and the second resonant capacitor C2 may be connected in series between the positive terminal P and the negative terminal N.

The first transmitting coil 121 may be provided between a first node N1 connected to the first inverter switch Q1 and the second inverter switch Q2 and a second node N2 connected to the first resonant capacitor C1 and the second resonant capacitor C2. In other words, one end of the first transmitting coil 121 may be connected to the first node N1, and another end of the first transmitting coil 121 may be connected to the second node N2.

The first inverter switch Q1 and the second inverter switch Q2 may be turned on/off according to a control signal from the transmission controller 160. As the first inverter switch Q1 and the second inverter switch Q2 are turned on/off, a current may flow through the first inverter switch Q1, the first transmitting coil 121, and the second resonant capacitor C2 or through the first resonant capacitor C1, the first transmitting coil 121, and the second inverter switch Q2.

As such, the intensity and direction of the current flowing through the first transmitting coil 121 may be changed by turning on/off the first inverter switch Q1 and the second inverter switch Q2 included in the first inverter 131a. In other words, an alternating current may be supplied to the first transmitting coil 121 from the first inverter 231.

As the first and second inverter switches Q1 and Q1 are turned on/off, a resonance may occur between the first transmitting coil 121 and the first and second resonant capacitors C1 and C2, and an alternating current may flow through the first transmitting coil 121 due to the resonance between the first transmitting coil 121 and the first and second resonant capacitors C1 and C2.

The transmission sensor 140 includes a first current sensor 141a and a second current sensor 141b.

The first and second current sensors 141a and 141b may measure the intensity and direction of a drive current supplied to the first transmitting coil 121 from the first inverter 131a and the intensity and direction of a drive current supplied to the second transmitting coil 122 from the second inverter 131b, respectively. For example, each of the first and second current sensors 141a and 141b may measure a potential difference between opposite ends of a shunt resistor or measure a magnetic field generated from a current.

The first and second current sensors 141a and 141b may supply an electrical signal (e.g., the potential difference between the opposite ends of the shunt resistor or output code of a hall sensor) corresponding to a measured current to the transmission controller 160. The transmission controller 160 may identify the intensity of a drive current supplied to the transmitting coil 120 based on an output signal of the transmission current sensor 141 and calculate the amount of power wirelessly transmitted to the electric devices 201 and 202 through the transmitting coil 120.

The first communicator 150 includes a wireless LAN module 152 and a short-range communication module 153.

The wireless LAN module 152 may exchange data with an access point (AP) and wirelessly exchange data with the electric devices 201 and 202 through the AP. For example, the wireless LAN module 152 may connect to a local network such as an intranet and/or a wide network such as the Internet through the AP. In addition, the electric devices 201 and 202 may also connect to a local network and/or a wide network, and the wireless LAN module 152 may exchange data with the electric devices 201 and 202 through the local network and/or the wide network.

The wireless LAN module 152 may exchange data wirelessly with the AP using a Wi-Fi™ communication protocol. In addition, the electric devices 201 and 202 may also wirelessly exchange data with the AP.

The short-range communication module 153 may exchange data directly with electric devices 201 and 202. For example, the short-range communication module 153 may transmit a radio signal directly to the electric devices 201 and 202 and receive a radio signal transmitted directly from the electric devices 201 and 202.

The short-range communication module 153 may exchange data wirelessly with the electric devices 201 and 202 using, for example, the Wi-Fi Direct™ communication protocol, a Bluetooth™ communication protocol, or a near-field communication (NFC) communication protocol.

The wireless LAN module 152 and the short-range communication module 153 may each include a dedicated antenna provided separately from the first transmitting coil 121 or the second transmitting coil 122.

For example, the short-range communication module 153 may include a first antenna 151a and a second antenna 151b dedicated thereto. As shown in FIG. 5, the first and second antennas 151a and 151b may be formed at an inner or outer side of the first and second transmitting coils 121 and 122 to be positioned concentrically with the first and second transmitting coils 121 and 122, respectively.

The transmission controller 160 may control the driver 130 to wirelessly supply power to the electric devices 201 and 202 based on whether the electric devices 201 and 202 are placed on the upper plate 102. For example, the transmission controller 160 may select at least one of a plurality of coils 120 based on detection of the electric devices 201 and 202 and control the driver 130 to supply a drive current to the at least one selected coil 120.

The transmission controller 160 may identify whether there is an object on the upper plate 102 through the plurality of coils 120. For example, the transmission controller 160 may control the driver 130 to supply a sensing current to the plurality of coils 120 and identify whether there is an object on the upper plate 102 based on the current of the plurality of coils 120.

The transmission controller 160 may control the short-range communication module 153 to transmit a radio signal to an object based on identifying the placement of the object on the upper plate 102. The transmission controller 160 may identify whether an object is the electric device 201 or 202 capable of wirelessly receiving power based on whether a radio signal is received from the object.

The transmission controller 160 may identify whether the transmitting coil 120 is aligned with the receiving coils 220 of the electric devices 201 and 202 during communication with the electric devices 201 and 202 based on the intensity of a communication signal. For example, the transmission controller 160 may identify whether the electric devices 201 and 202 are located at a reference position for alignment of the transmitting coil 120 and the receiving coil 220.

The transmission controller 160 may warn a user based on the non-alignment of the transmitting coil 120 with the receiving coils 220 of the electric devices 201 and 202. For example, the transmission controller 160 may warn a user based on the positioning of the electric devices 201 and 202 at a non-reference position.

The transmission controller 160 may control the driver 130 to supply a drive current to the transmitting coil 120 based on identifying the placement of the electric devices 201 and 202 on the upper plate 102.

The transmission controller 160 may include a processor 161 and a memory 162.

The memory 162 may store a control program and control data for controlling an operation of the power station 100. In particular, the memory 162 may store a driving program and driving data for controlling the driver 130. In addition, the memory 162 may temporarily store a result of processing by the processor 161 and the like.

The memory 162 may store a program and/or data according to a request from the processor 161 and provide the stored program and/or data to the processor 161.

The memory 162 may include a volatile memory such as a static random access memory (SRAM) or a dynamic random access memory (DRAM) and a nonvolatile memory such as a read-only memory (ROM), an erasable programmable read-only memory (EPROM) or a flash memory.

The processor 161 may process data of the memory 162 according to the program provided from the memory 162 and generate a control signal for controlling the driver 130, the control panel 110, and the like according to a result of processing the data.

The processor 161 may include a logical operation circuit, an arithmetic operation circuit, a storage circuit, etc.

The memory 162 and the processor 161 may each be embodied as separate integrated circuits (ICs) or may be implemented together as an IC.

Figure 7:
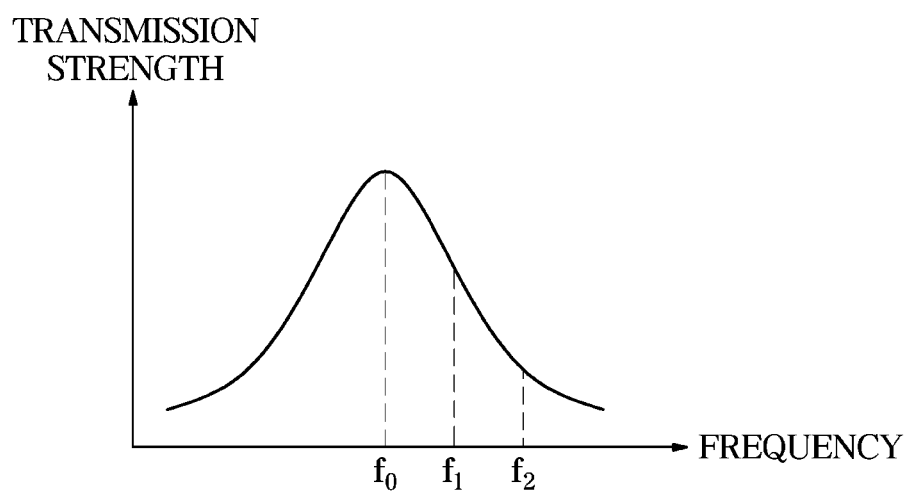
FIG. 7 illustrates an example of power transmission strength of a first transmitting coil according to an operating frequency of a first inverter included in a power station according to an embodiment.
Figure 8:
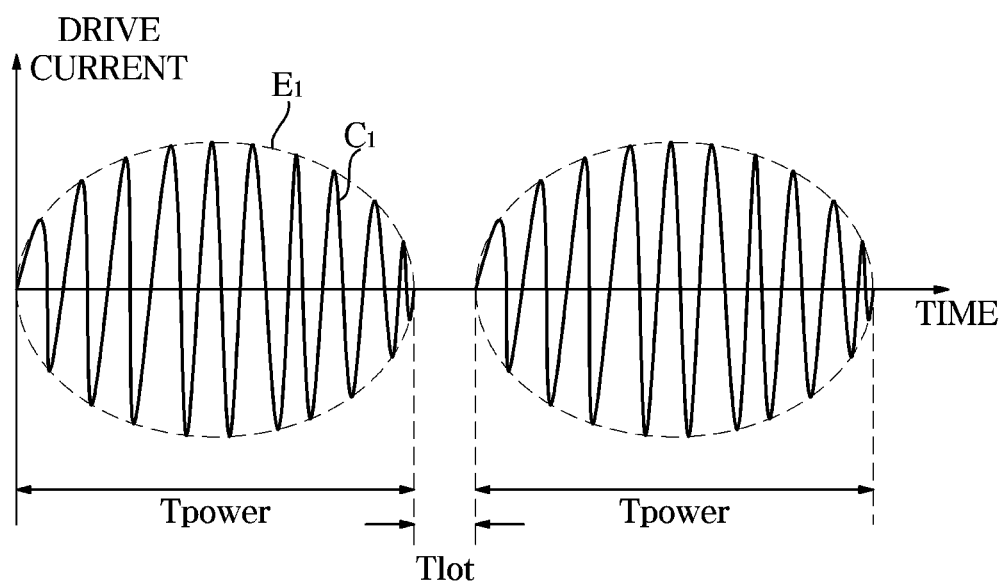
FIG. 8 illustrates an example of a drive current supplied to a first transmitting coil from a first inverter included in a power station according to an embodiment.
Figure 9:
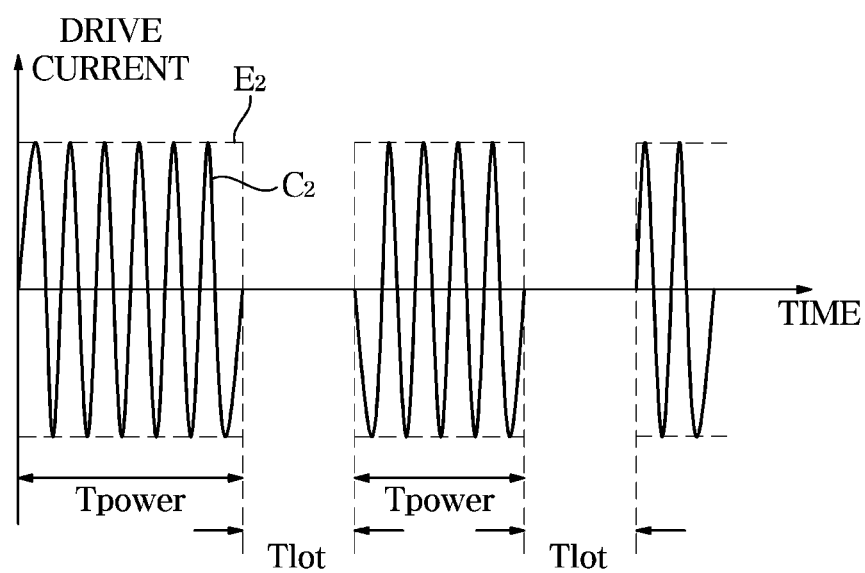
FIG. 9 illustrates another example of a drive current supplied to a first transmitting coil from a first inverter included in a power station according to an embodiment.

FIG. 7 illustrates an example of power transmission strength of a first transmitting coil according to an operating frequency of a first inverter included in a power station according to an embodiment. FIG. 8 illustrates an example of a drive current supplied to a first transmitting coil from a first inverter included in a power station according to an embodiment. FIG. 9 illustrates another example of a drive current supplied to a first transmitting coil from a first inverter included in a power station according to an embodiment.

A drive current (power) supplied to the first transmitting coil 121 may vary according to a turn-on/off frequency (switching frequency) of the first and second inverter switches Q1 and Q2. Thus, the amount of power transmitted to the electric devices 201 and 202 through the first transmitting coil 121 may vary according to switching frequencies of the first and second inverter switches Q1 and Q2.

For example, the amount of power supplied to the first transmitting coil 121 may be maximum when the switching frequencies of the first and second inverter switches Q1 and Q2 are the same as a resonance frequency f0 between the first transmitting coil 121 and the first and second resonant capacitors C1 and C2.

When the switching frequencies of the first and second inverter switches Q1 and Q2 are higher than the resonance frequency f0, the amount of power supplied to the first transmitting coil 121 may decrease as the switching frequency increases. As shown in FIG. 9, the amount of power supplied to the first transmitting coil 121 when the first and second inverter switches Q1 and Q2 are switched at a first frequency f1 higher than the resonance frequency f0 is greater than the amount of power supplied to the first transmitting coil 121 when the first and second inverter switches Q1 and Q2 are switched at a second frequency f2 higher than the first frequency f1.

When the switching frequencies of the first and second inverter switches Q1 and Q2 are higher than the resonance frequency f0, the intensity of a magnetic field generated by the first transmitting coil 121 may decrease as the switching frequency increases.

When the switching frequencies of the first and second inverter switches Q1 and Q2 are lower than the resonance frequency f0, the amount of power to be supplied to the first transmitting coil 121 may decrease as the switching frequency reduces. When the switching frequencies of the first and second inverter switches Q1 and Q2 are lower than the resonance frequency f0, the intensity of a magnetic field generated by the first transmitting coil 121 may decrease as the switching frequency reduces.

As described above, alternating current power is supplied to the first transmitting coil 121 due to switching operations of the first and second inverter switches Q1 and Q2 included in the first inverter 231, and the first transmitting coil 121 may generate a magnetic field B. The intensity of the magnetic field B generated by the first transmitting coil 121 may vary according to the switching frequencies of the first and second inverter switches Q1 and Q2. When the switching frequencies of the first and second inverter switches Q1 and Q2 are higher than the resonance frequency f0, the intensity of a magnetic field generated by the first transmitting coil 121 may decrease as the switching frequency increases.

A drive current supplied to the first transmitting coil 121 by the first inverter 131a may be, for example, as shown in FIG. 8 or 9.

As shown in FIG. 8, the drive current may include a carrier C1 of a frequency between, for example, 10 kHz to 100 kHz. The carrier C1 may be generated due to a resonance between the first transmitting coil 121 and the first and second resonant capacitors C1 and C2 when the first inverter switch Q1 is turned on/off.

In this case, an amplitude of the carrier C1 (an envelope E1 of the carrier C1) may change in the form of a sine wave. The envelope E1 may be, for example, a sine wave of a 50 Hz or 60 Hz. A frequency of the envelope E1 may be the same as, for example, a frequency of the external power source ES.

The envelope E1 that is in the form of sine wave may periodically become "0." When the envelope E1 of the carrier C1 is "0," a drive current is not supplied to the transmitting coil 120 and no power is transmitted to the electric devices 201 and 202 through the transmitting coil 120. In other words, there is an idle period Tslot in which the supply of power is stopped.

Specifically, the operation of the power station 100 may be divided into a transmission period Tpower in which power is supplied to the electric devices 201 and 202 and the idle period Tslot in which the supply of power to the electric devices 201 and 202 is stopped.

During the idle period Tslot, the power station 100 may exchange data with electric devices 201 and 202 through communication with the electric devices 201 and 202. For example, the power station 100 may obtain information about operations of the electric devices 201 and 202 during the idle period Tslot.

As shown in FIG. 9, the drive current may include a carrier C2 of a frequency between, for example, 10 kHz to 100 kHz.

In this case, an amplitude of the carrier C2 (an envelope E2 of the carrier C2) may change in the form of a square wave. The envelope E2 may be, for example, a sine wave of 50 Hz or 60 Hz.

The envelope E2 that is in the form of square wave may periodically become "0." In other words, there is the idle period Tslot in which the supply of power is stopped. The operation of the power station 100 may be divided into the transmission period Tpower and the idle period Tslot, and the power station 100 may obtain information about the operations of the electric devices 201 and 202 during the idle period Tslot.

An operation of the power station 100 will be described below.

Figure 10:
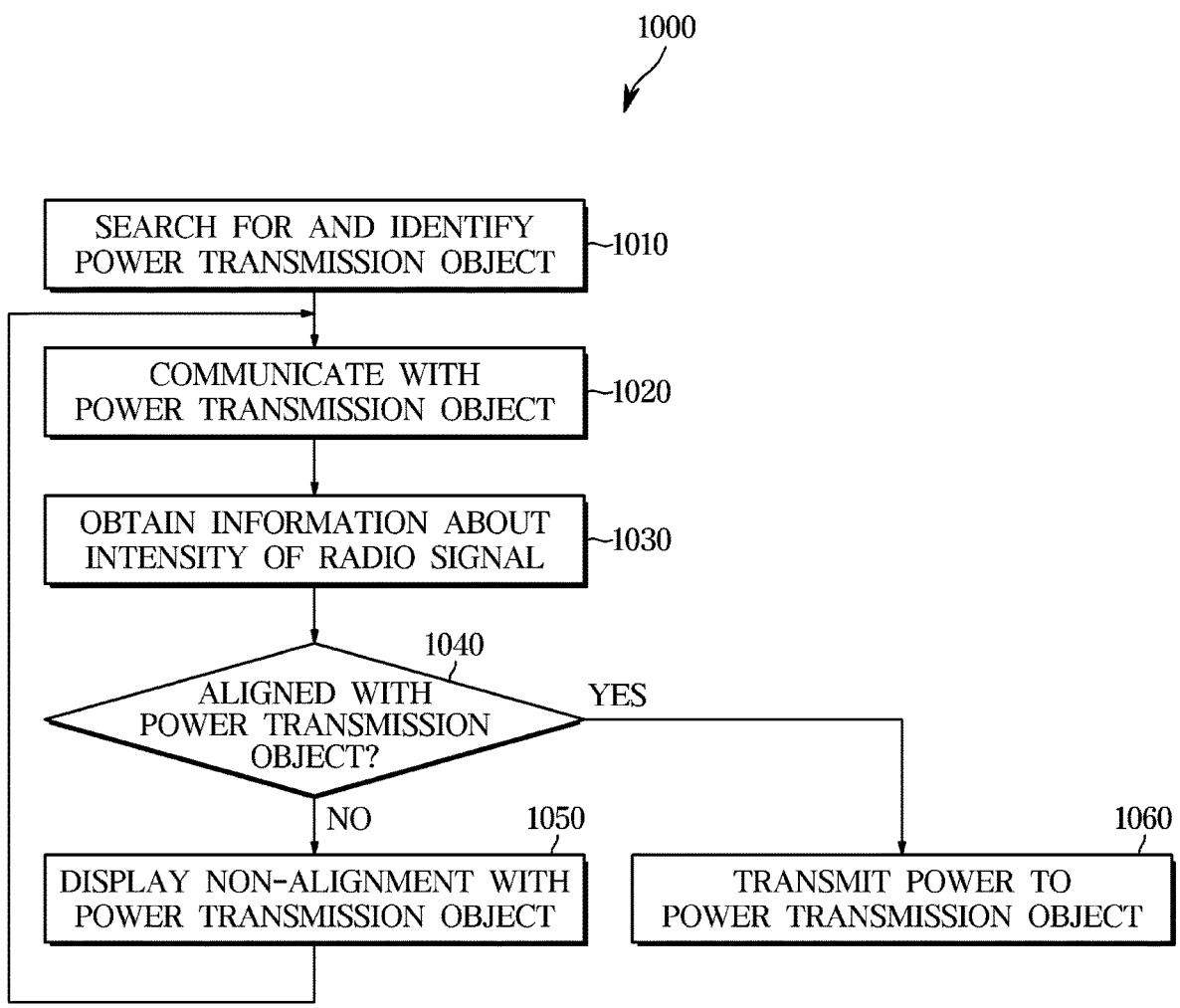
FIG. 10 illustrates an example of identifying whether a power station is aligned with an electric device according to an embodiment.
Figure 11:
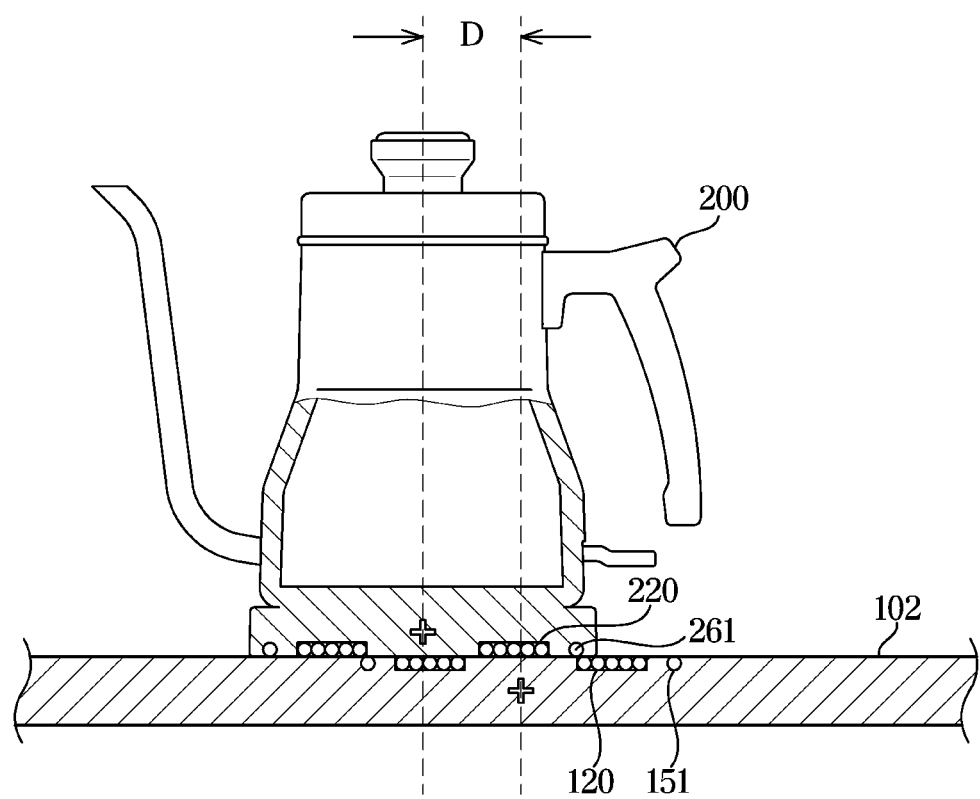
FIG. 11 illustrates an example in which a power station is not aligned with an electric device according to an embodiment.
Figure 12:
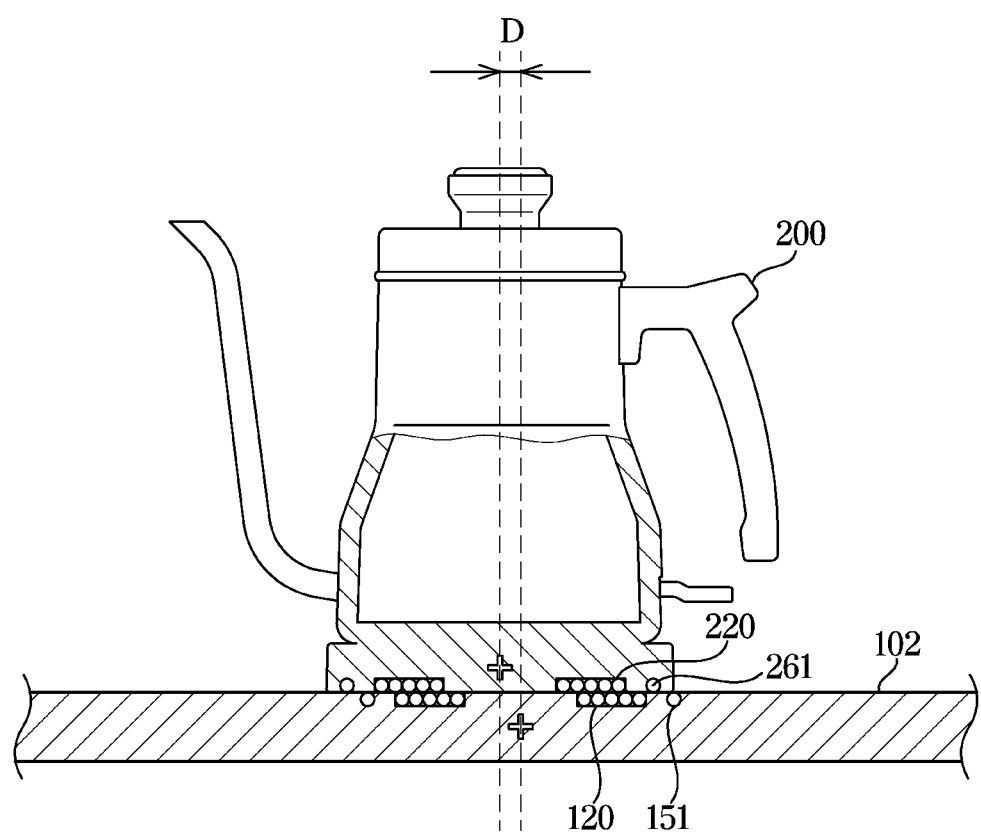
FIG. 12 illustrates an example in which a power station is aligned with an electric device according to an embodiment.

FIG. 10 illustrates an example of identifying whether a power station is aligned with an electric device according to an embodiment. FIG. 11 illustrates an example in which a power station is not aligned with an electric device according to an embodiment. FIG. 12 illustrates an example in which a power station is aligned with an electric device according to an embodiment.

An example 1000 of identifying whether the power station 100 is aligned with the electric devices 201 and 202 will be described with reference to FIGS. 10, 11, and 12 below.

The power station 100 searches for and identifies objects to which power is to be transmitted wirelessly (1010).

The transmission controller 160 may periodically identify whether objects to which power is to be transmitted wirelessly are placed on the upper plate 102.

For example, the transmission controller 160 may control the first and second inverters 131*a* and 131*b* to supply a sensing current, for sensing an object, to the first and second transmitting coils 121 and 122. The first and second inverters 131*a* and 131*b* may apply a low alternating current voltage, for sensing an object, to the first and second transmitting coils 121 and 122 under control of the transmission controller 160.

The first and second current sensors 141*a* and 141*b* may measure a current supplied to (a current flowing through) the first and second transmitting coils 121 and 122 using a low alternating current voltage for sensing an object and transmit an electrical signal corresponding to the measured current to the transmission controller 160.

The transmission controller 160 may identify whether there are objects on the upper plate 102 based on output signals of the first and second current sensors 141*a* and 141*b* (currents flowing through the first and second transmitting coils 121 and 122). In addition, the transmission controller 160 may identify whether objects are placed at a position corresponding to the first transmitting coil 121 or a position corresponding to the second transmitting coil 122.

The power station 100 attempts to wirelessly communicate with the objects to which power is to be transmitted wirelessly (1020).

The transmission controller 160 may attempt to communicate with the objects based on identifying the placement of the objects on the upper plate 102.

For example, the transmission controller 160 may control the first communicator 150 to wirelessly transmit a request signal requesting to transmit a response from the objects. The first communicator 150 may transmit the request signal through the transmission antenna 151 and wait for response signals from the objects.

The transmission controller 160 may identify, as the electric devices 201 and 202, the objects to which power is to be transmitted wirelessly based on the response signals received from the objects within a predetermined time through the first communicator 150. The transmission controller 160 may identify that an object is not an object to which power is to be transmitted wirelessly based on a response signal that is not received from the object within the predetermined time through the first communicator 150.

For example, the electric devices 201 and 202 may transmit response signals including identification information thereof to the power station 100 in response to a request signal from the power station 100. The transmission controller 160 may identify the electric devices 201 and 202 based on the response signals from the electric devices 201 and 202.

The power station 100 obtains information about the intensity of a radio signal for communication with the objects to which power is to be transmitted (1030).

The transmission controller 160 may measure the intensities of radio signals received from the electric devices 201 and 202. For example, the first communicator 150 may measure the intensity of a radio signal received through the transmission antenna 151 and provide the transmission controller 160 with information about the measured intensity of the radio signal.

The transmission controller 160 may obtain information about the intensity of a radio signal received by the electric devices 201 and 202 from the power station 100. For example, the electric devices 201 and 202 may transmit a response signal including information about the intensity of a received signal to the power station 100 in response to a request signal from the power station 100. The information about the intensity of the received signal may be in various formats. For example, the information about the intensity of the received signal may include a received-signal strength indicator.

The power station 100 identifies whether the objects to which power is to be transmitted is aligned therewith (1040).

The transmission controller 160 may identify whether the transmitting coil 120 of the power station 100 is aligned with the receiving coils 220 of the electric devices 201 and 202 based on the intensity of the radio signal. The transmission controller 160 may identify whether the electric devices 201 and 202 are located at a reference position for alignment of the transmitting coil 120 and the receiving coil 220.

For example, as shown in FIG. 11, when a receiving coil 220 of an electric device 200 is not aligned with the transmitting coil 120 of the power station 100, the efficiency of power transmission to the receiving coil 220 from the transmitting coil 120 may decrease. Specifically, when the distance D between a central axis of the receiving coil 220 and a central axis of the transmitting coil 120 is greater than a reference distance, the efficiency of power transmission to the receiving coil 220 from the transmitting coil 120 may be less than a reference value.

The transmission controller 160 may identify whether the receiving coil 220 is aligned with the transmitting coil 120 based on the intensity of a radio signal used for communication with the electric device 200. A central axis of the transmission antenna 151 of the short-range communication module 153 may substantially coincide with the central axis of the transmitting coil 120. Accordingly, when the distance D between the central axis of the receiving coil 220 and the central axis of the transmitting coil 120 is greater than the reference distance, the central axis of the transmission antenna 151 and a central axis of the reception antenna 261 may be greater than the reference distance. Therefore, the intensity of a radio signal received by the power station 100 or the electric device 200 may be less than a reference intensity.

Therefore, the transmission controller 160 may identify that the transmitting coil 120 is not aligned with the receiving coil 220 when the intensity of the radio signal is less than the reference intensity.

For example, as shown in FIG. 11, when the distance D between the central axis of the receiving coil 220 and the central axis of the transmitting coil 120 is less than the reference distance, the efficiency of power transmission to the receiving coil 220 from the transmitting coil 120 may be greater than the reference value. When the distance D between the central axis of the receiving coil 220 and the central axis of the transmitting coil 120 is less than the reference distance, the intensity of a radio signal received by the power station 100 or the electric device 200 may be greater than the reference intensity.

Therefore, the transmission controller 160 may identify that the transmitting coil 120 is aligned with the receiving coil 220 when the intensity of the radio signal is greater than or equal to the reference intensity.

When it is identified that the power station 100 is not aligned with the objects to which power is to be transmitted (No in 1040), the power station 100 displays the non-alignment with the objects (1050).

The transmission controller 160 may identify whether the transmitting coil 120 is aligned with the receiving coil 220 based on reception strength of radio signals received from and/or received by the electric devices 201 and 202.

When the transmitting coil 120 is not aligned with the receiving coil 220, the efficiency of power transmission to the receiving coil 220 from the transmitting coil 120 may be lower than a reference value for permission of wireless power transmission.

The transmission controller 160 may control the display 112 to display a message indicating that the transmitting coil 120 is not aligned with the receiving coil 220 based on the non-alignment of the transmitting coil 120 with the receiving coil 220. For example, the transmission controller 160 may control the display 112 to display a message requesting to reposition the electric devices 201 and 202 on the upper plate 102.

The transmission controller 160 may control the wireless LAN module 152 to transmit a message indicating that the transmitting coil 120 is not aligned with the receiving coil 220 based on the non-alignment of the transmitting coil 120 with the receiving coil 220. For example, the transmission controller 160 may control the wireless LAN module 152 to transmit a message requesting to reposition the electric devices 201 and 202 on the upper plate 102.

During displaying of a message on the display 112, the transmission controller 160 may communicate with the electric devices 201 and 202, obtain information about the intensities of radio signals, and identify whether the power station 100 is aligned with the electric devices 201 and 202.

When it is identified that the power station 100 is aligned with the objects to which power is to be transmitted (Yes in 1040), the power station 100 wirelessly transmits power to the objects (1060).

The transmission controller 160 may control the driver 130 to wirelessly transmit power through the transmitting coil 120 based on the alignment of the transmitting coil 120 with the receiving coil 220. For example, the transmission controller 160 may alternately turn on or off the first inverter switch Q1 and the second inverter switch Q2 of the first inverter 131*a* to supply an alternating current to the first transmitting coil 121.

As the first and second inverter switches Q1 and Q2 are turned on/off, an alternating current may be supplied to the first transmitting coil 121, and the first transmitting coil 121 may provide an alternating current magnetic field. Due to the alternating current magnetic field, an alternating current may be induced to the receiving coil 220, and power may be supplied to the electric devices 201 and 202.

As described above, the power station 100 may identify whether the transmitting coil 120 is aligned with the receiving coil 220 during communication with the electric devices 201 and 202 based on the intensity of a radio signal and may request a user to reposition the electric devices 201 and 202 based on whether the transmitting coil 120 is aligned with the receiving coil 220.

Thus, the power station 100 may allow the user to reposition the electric devices 201 and 202 such that the transmitting coil 120 is aligned with the receiving coil 220. In addition, the power station 100 may improve the efficiency of power transmission to the electric devices 201 and 202.

Figure 13:
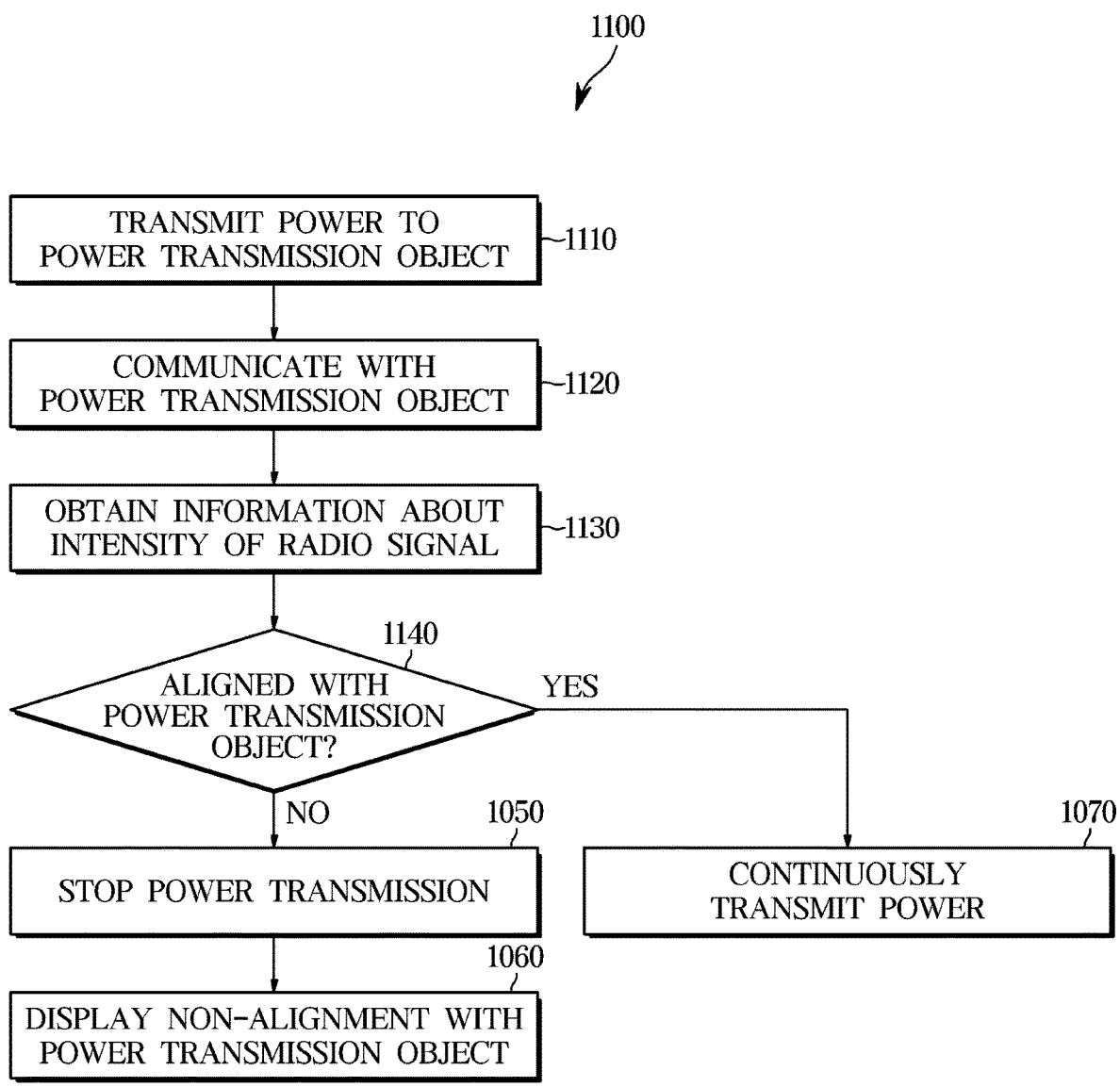
FIG. 13 illustrates an example of identifying whether a power station is aligned with an electric device according to an embodiment.

FIG. 13 illustrates an example of identifying whether a power station is aligned with an electric device according to an embodiment.

An example 1100 of identifying whether the power station 100 is aligned with the electric devices 201 and 202 will be described with reference to FIG. 13 below.

The power station 100 wirelessly transmits power to an object to which power is to be transmitted (1110).

As described above, the transmission controller 160 may control the driver 130 to wirelessly transmit power through the transmitting coil 120 based on the alignment of the transmitting coil 120 with the receiving coil 220.

The power station 100 communicates with the object to which power is to be transmitted during an idle period of a power transmission operation (1120).

As described above with reference to FIGS. 8 and 9, the power transmission operation may be divided into a transmission period Tpower in which power is supplied to the electric devices 201 and 202 and an idle period Tslot in which the supply of power to the electric devices 201 and 202 is stopped.

During the transmission period Tpower, the transmission controller 160 may control the driver 130 to wirelessly transmit power to the electric device 201 and 202.

During the idle period Tslot, the transmission controller 160 may control the short-range communication module 153 to exchange data with the electric devices 201 and 202. For example, the transmission controller 160 may receive operation information of the electric devices 201 and 202 or information about reception strength of communication signals from the electric devices 201 and 202.

The power station 100 obtains information about the reception strength of a radio signal for communication with the object to which power is to be transmitted (1130).

During the idle period Tslot, the transmission controller 160 may measure the intensities of radio signals received from the electric devices 201 and 202. During the idle period Tslot, the transmission controller 160 may also receive information about the intensity of a radio signal received from the power station 100 by the electric devices 201 and 202.

The power station 100 identifies whether the object to which power is to be transmitted is aligned therewith (1140).

The transmission controller 160 may identify whether the transmitting coil 120 of the power station 100 is aligned with the receiving coils 220 of the electric devices 201 and 202 based on the intensity of the radio signal.

Operation 1140 may be substantially the same as operation 1040 illustrated in FIG. 10.

When it is identified that the power station 100 is not aligned with the object to which power is to be transmitted (No in 1140), the power station 100 stops the transmission of power to the object to which power is transmitted (1150).

The power station 100 may wirelessly transmit power to the electric devices 201 and 202 when the electric devices 201 and 202 are placed on the power station 100 based on the alignment of the transmitting coil 120 with the receiving coil 220.

Thereafter, the electric devices 201 and 202 may be moved onto the upper plate 102. For example, the electric devices 201 and 202 may be moved by a user or through an operation of the electric devices 201 and 202.

When the electric devices 201 and 202 are moved during the alignment of the transmitting coil 120 with the receiving coil 220, the transmitting coil 120 may not be aligned with the receiving coil 220. In other words, the alignment of the transmitting coil 120 and the receiving coil 220 may be canceled due to the movement of the electric devices 201 and 202.

As such, when the alignment of the transmitting coil 120 and the receiving coil 220 is canceled, the transmission controller 160 may control the driver 130 to stop the transmission of power to the electric devices 201 and 202. For example, the transmission controller 160 may turn off both the first inverter switch Q1 and the second inverter switch Q2.

Thereafter, the power station 100 displays non-alignment with the object to which power is to be transmitted (1160).

Operation 1160 may be the same as operation 1050 illustrated in FIG. 10.

When it is identified that the power station 100 is aligned with the object to which power is to be transmitted (Yes in 1140), the power station 100 continuously transmits power to the object to which power is to be transmitted (1170).

Operation 1170 may be the same as operation 1060 illustrated in FIG. 10.

As described above, the power station 100 may communicate with the electric devices 201 and 202 during wireless transmission of power to the electric devices 201 and 202 and identify whether the transmitting coil 120 is aligned with the receiving coil 220 based on reception strength of a radio signal. In addition, the power station 100 may stop the transmission of power to the electric devices 201 and 202 and request a user to reposition the electric devices 201 and 202 based on whether the transmitting coil 120 is aligned with the receiving coil 220.

Therefore, the power station 100 may identify non-alignment of the transmitting coil 120 and the receiving coil 220 due to the movement of the electric device 201 and 202 during an operation of the power station 100. The power station 100 may allow the user to reposition the electric devices 201 and 202 such that the transmitting coil 120 is aligned with the receiving coil 220. In addition, the power station 100 may improve the efficiency of power transmission to the electric devices 201 and 202.

Figure 14:
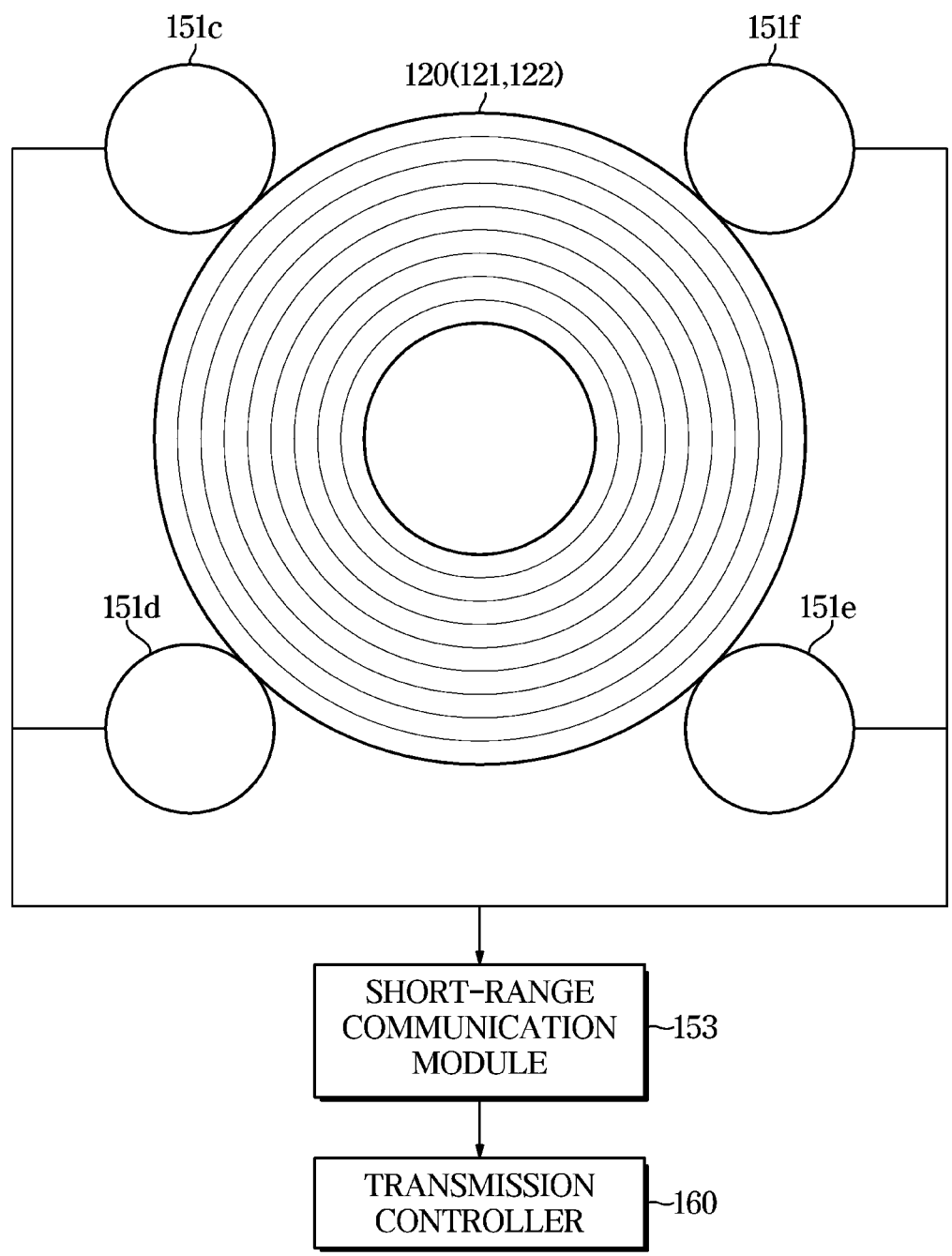
FIG. 14 illustrates an example of a transmission antenna of a short-range communication module included in a power station according to an embodiment.

FIG. 14 illustrates an example of a transmission antenna of a short-range communication module included in a power station according to an embodiment.

FIG. 5 illustrates the transmission antenna 151 disposed on an inner or outer side of the transmitting coil 120 to be positioned concentrically with the transmitting coil 120. However, the transmission antenna 151 is not limited to that shown in FIG. 5.

The transmission antenna 151 may be disposed near the transmitting coil 120. For example, the transmission antenna 151 may be disposed on a circumference of a circle surrounding the transmitting coil 120 as shown in FIG. 14.

The transmission antenna 151 may include a first auxiliary antenna 151*c*, a second auxiliary antenna 151*d*, a third auxiliary antenna 151*e*, and a fourth auxiliary antenna 151*f*, and the first, second, third and fourth auxiliary antennas 151*c*, 151*d*, 151*e*, and 151*f* may be disposed along the circumference of the circle surrounding the transmitting coil 120.

The first, second, third and fourth auxiliary antennas 151*c*, 151*d*, 151*e* and 151*f* may be arranged at a predetermined angle interval to maximize a distance therebetween. For example, the first, second, third and fourth auxiliary antennas 151*c*, 151*d*, 151*e* and 151*f* may be arranged along the circumference of the circle surrounding the transmitting coil 120 such that an angle interval therebetween is approximately 90 degrees.

By arranging the transmission antenna 151 along the circumference of the circle surrounding the transmitting coil 120, the power station 100 may identify a position of the receiving coil 220 relative to the transmitting coil 120 through communication with the electric devices 201 and 202.

The power station 100 may measure reception strength of radio signals received through the auxiliary antennas 151*c*, 151*d*, 151*e*, and 151*f*. The power station 100 may measure first reception strength of a radio signal during communication with the electric devices 201 and 202 through the first auxiliary antenna 151*c*, measure second reception strength of a radio signal during communication with the electric devices 201 and 202 through the second auxiliary antenna 151*d*, measure third reception strength of a radio signal during communication with the electric devices 201 and 202 through the third auxiliary antenna 151*e*, and measure fourth reception strength of a radio signal during communication with the electric devices 201 and 202 through the fourth auxiliary antenna 151*f*.

The power station 100 may identify the distances between the auxiliary antennas 151*c*, 151*d*, 151*e*, and 151*f* and the reception antenna 261 based on the measured reception strengths of the radio signals. The power station 100 may calculate a first distance between the first auxiliary antenna 151*c* and the reception antenna 261 based on the first reception strength, calculate a second distance between the second auxiliary antenna 151*d* and the reception antenna 261 based on the second reception strength, calculate a third distance between the third auxiliary antenna 151*e* and the reception antenna 261 based on the third reception strength, and calculate a fourth distance between the fourth auxiliary antenna 151*f* and the reception antenna 261 based on the fourth reception strength.

The power station 100 may identify a position of the receiving coil 220 relative to the transmitting coil 120 based on the distances between the auxiliary antennas 151*c*, 151*d*, 151*e*, and 151*f* and the reception antenna 261. The power station 100 may identify the position of the receiving coil 220 relative to the transmitting coil 120 based on the first distance, the second distance, the third distance, and the fourth distance. The power station 100 may identify whether the transmitting coil 120 is aligned with the receiving coil 220 based on the position of the receiving coil 220 relative to the transmitting coil 120.

Alternatively, the power station 100 may identify a direction in which the electric devices 201 and 202 are to be moved so as to align the transmitting coil 120 with the receiving coil 220. The power station 100 may display an image for guiding the electric devices 201 and 202 to be moved in the identified direction on the display 112. For example, the power station 100 may identify the direction in which the electric devices 201 and 202 are to be moved based on a largest value among the first distance, the second distance, the third distance, and the fourth distance. When the fourth distance between the fourth auxiliary antenna 151*f* and the reception antenna 261 is a largest value, the power station 100 may display an image for guiding the electric device 201 and 202 to be moved toward the fourth auxiliary antenna 151*f* on the display 112.

As described above, by arranging the transmission antenna 151 along the circumference of the circle surrounding the transmitting coil 120, the power station 100 may identify the position of the receiving coil 220 relative to the transmitting coil 120 and identify the direction in which the electric devices 201 and 202 are to be moved so as to align the transmitting coil 120 with the receiving coil 220.

Figure 15:
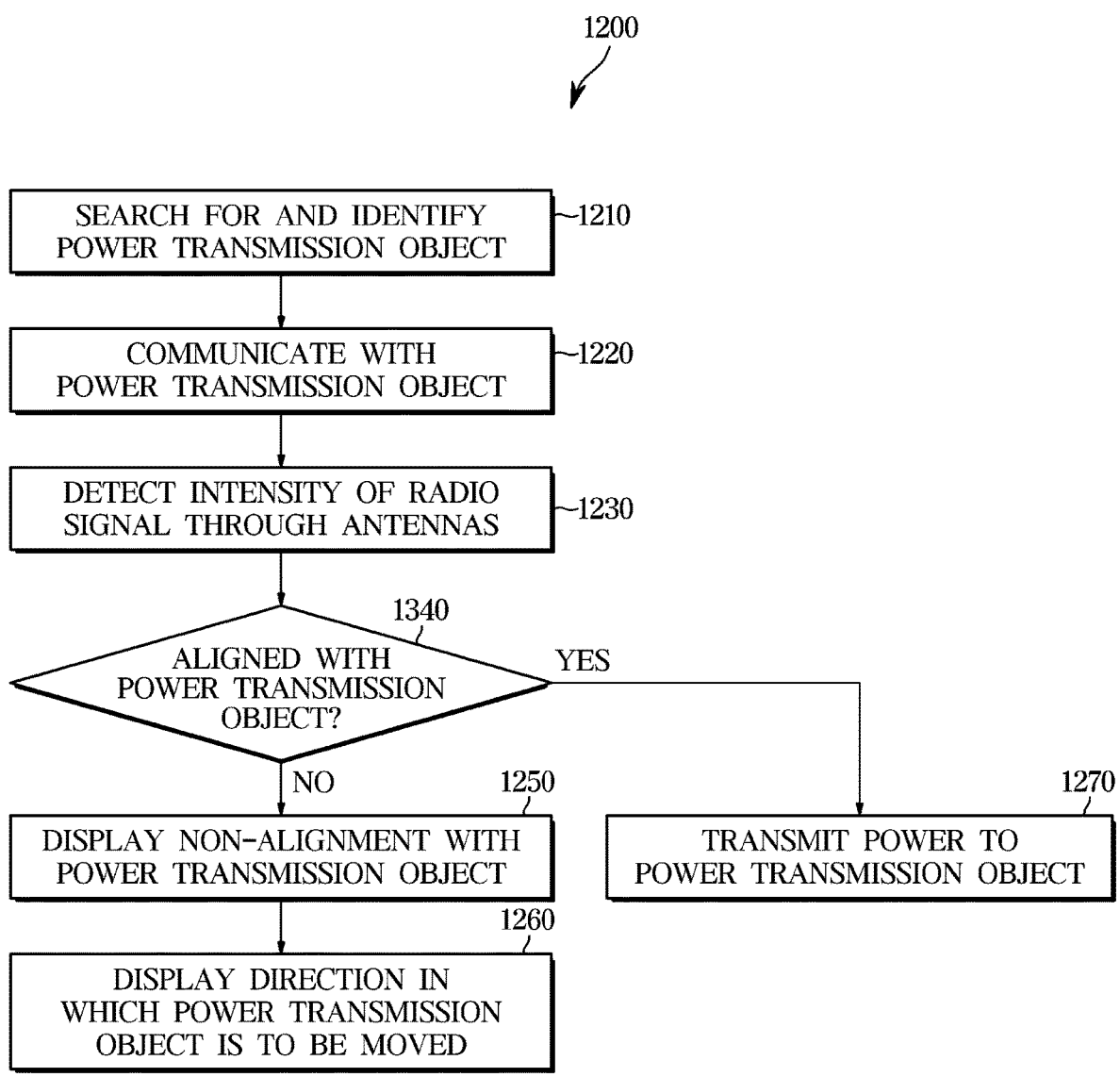
FIG. 15 illustrates an example of identifying whether a power station is aligned with an electric device according to an embodiment.

FIG. 15 illustrates an example of identifying whether a power station is aligned with an electric device according to an embodiment. FIG. 16 illustrates an example in which a power station is not aligned with an electric device according to an embodiment.

An example 1200 of identifying whether the power station 100 is aligned with the electric devices 201 and 202 will be described with reference to FIGS. 15 and 16 below.

The power station 100 searches for and identifies an object to which power is to be transmitted wirelessly (1210) and attempts to wirelessly communicate with the object (1220).

Operations 1210 and 1220 may be the same as operations 1010 and 1020 of FIG. 10, respectively.

The power station 100 obtains information about reception strength of radio signals received through the auxiliary antennas 151*c*, 151*d*, 151*e*, and 151*f*.

The transmission controller 160 may measure intensities of radio signals received through the auxiliary antennas 151*c*, 151*d*, 151*e*, and 151*f*. For example, the first communicator 150 may measure the intensities of radio signals received through the first auxiliary antenna 151*c*, the second auxiliary antenna 151*d*, the third auxiliary antenna 151*e* and the fourth auxiliary antenna 151*f* and provide information about the measured intensities of the radio signals to the transmission controller 160.

The transmission controller 160 may obtain information about the intensities of radio signals received from the auxiliary antennas 151*c*, 151*d*, 151*e*, and 151*f* of the power station 100 by the electric devices 201 and 202. For example, the transmission controller 160 may obtain information about the intensities of radio signals received from the first auxiliary antenna 151*c*, the second auxiliary antenna 151*d*, the third auxiliary antenna 151*e*, and the fourth auxiliary antenna 151*f* by the electric devices 201 and 202.

The power station 100 identifies whether the object to which power is to be transmitted is aligned therewith (1240).

The transmission controller 160 may identify the distances between the auxiliary antennas 151*c*, 151*d*, 151*e*, and 151*f* and the reception antenna 261 based on the intensities of the radio signals. The transmission controller 160 may identify a position of the receiving coil 220 relative to the transmitting coil 120, based on the distances between the auxiliary antennas 151*c*, 151*d*, 151*e*, and 151*f* and the reception antenna 261.

The transmission controller 160 may identify whether the transmitting coil 120 is aligned with the receiving coil 220 based on the position of the receiving coil 220 relative to the transmitting coil 120. For example, when the difference between a maximum value and a minimum value among the distances between the auxiliary antenna 151*c*, 151*d*, 151*e*, and 151*f* and the reception antenna 261 is less than a reference value, the transmission controller 160 may identify that the transmitting coil 120 is aligned with the receiving coil 220. On the other hand, when the difference between the maximum value and the minimum value among the distances between the auxiliary antenna 151*c*, 151*d*, 151*e*, and 151*f* and the reception antenna 261 is greater than the reference value, the transmission controller 160 may identify that the transmitting coil 120 is not aligned with the receiving coil 220.

When it is identified that the power station 100 is not aligned with the object to which power is to be transmitted (No in 1240), the power station 100 displays the non-alignment with the object to which power is to be transmitted (1250).

Operation 1250 may be the same as operation 1050 illustrated in FIG. 10.

The power station 100 displays a direction in which the electric devices 201 and 202 are to be moved so as to align with the object to which power is to be transmitted (1260).

The transmission controller 160 may control the display 112 to display the direction in which the electric devices 201 and 202 are to be moved so as to align the transmitting coil 120 with the receiving coil 220 based on the non-alignment of the transmitting coil 120 with the receiving coil 220.

The transmission controller 160 may identify the direction in which the electric devices 201 and 202 are to be moved based on the larges value among the distances between the auxiliary antennas 151*c*, 151*d*, 151*e*, and 151*f* and the reception antenna 261. Specifically, the transmission controller 160 may control the display 112 to display an image for guiding the electric devices 201 and 202 to be moved toward an antenna spaced a largest distance from the reception antenna 261.

For example, as shown in FIG. 16, when the distance between the second auxiliary antenna 151*d* and the reception antenna 261 is largest, the transmission controller 160 may control the display 112 to display an image I1 for guiding the electric devices 201 and 202 to be moved toward the second auxiliary antenna 151*d*.

A user may move the electric devices 201 and 202 according to an image displayed on the display 112.

When it is identified that the power station 100 is aligned with the object to which power is to be transmitted (Yes in 1240), the power station 100 wirelessly transmits power to the object (1270).

Operation 1270 may be the same as operation 1060 illustrated in FIG. 10.

As described above, the power station 100 may display a direction in which the electric devices 201 and 202 are to be moved so as to align the transmitting coil 120 with the receiving coil 220 during communication with the electric devices 201 and 202 based on reception strength of a radio signal.

Accordingly, the power station 100 may allow a user to reposition the electric devices 201 and 202 such that the transmitting coil 120 is aligned with the receiving coil 220. In addition, the power station 100 may improve the efficiency of power transmission to the electric devices 201 and 202.

Figure 17:
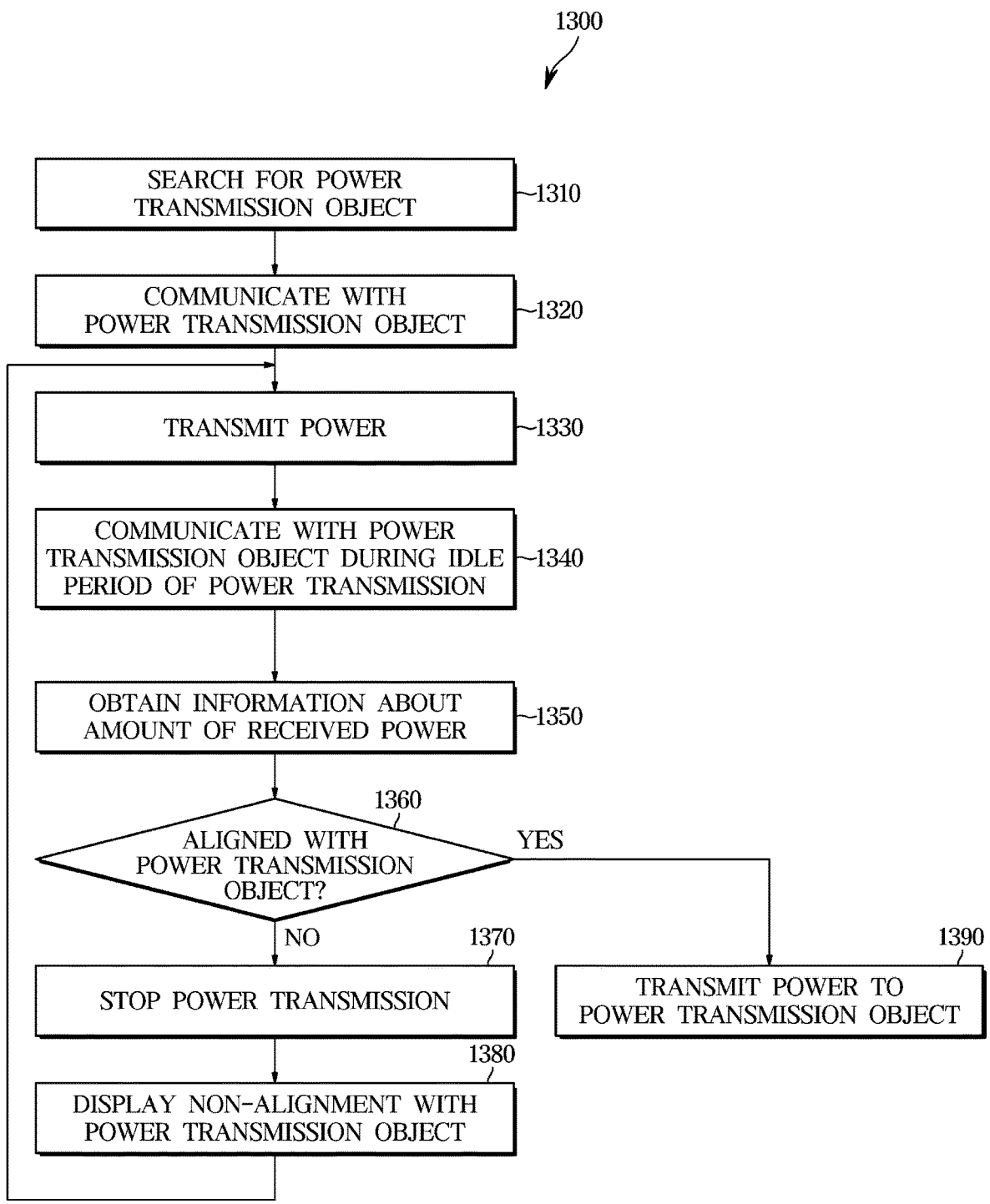
FIG. 17 illustrates an example of identifying whether a power station is aligned with an electric device according to an embodiment.

FIG. 17 illustrates an example of identifying whether a power station is aligned with an electric device according to an embodiment.

An example 1300 of identifying whether the power station 100 is aligned with the electric devices 201 and 202 will be described with reference to FIG. 17 below.

The power station 100 searches for and identifies an object to which power is to be transmitted wirelessly (1310) and attempts to wirelessly communicate with the object (1320).

Operations 1310 and 1320 may be the same as operations 1010 and 1020 of FIG. 10, respectively.

The power station 100 wirelessly transmits power to the object to which power is to be transmitted (1330).

Operation 1330 may be the same as operation 1060 illustrated in FIG. 10.

The power station 100 communicates with the object to which power is to be transmitted during an idle period of a power transmission operation (1340).

The power transmission operation may be divided into a transmission period Tpower in which power is supplied to the electric devices 201 and 202 and an idle period Tslot in which the supply of power to the electric devices 201 and 202 is stopped.

During the idle period Tslot, the transmission controller 160 may control the short-range communication module 153 to exchange data with the electric devices 201 and 202. For example, the transmission controller 160 may receive operation information of the electric devices 201 and 202 or information about the amount of power received wirelessly by the electric devices 201 and 202.

The power station 100 obtains the information about the amount of power received wirelessly by the object to which power is to be transmitted (1350).

As described above, the electric devices 201 and 202 may calculate the amount of power received wirelessly based on an output of the received-current sensor 231. The received-current sensor 231 may measure a current supplied from the receiving coil 220 to the power converter 240, and the reception controllers 280 of the electric devices 201 and 202 may identify the intensity of a current output from the receiving coil 220 based on an output signal of the received-current sensor 231 and calculate the amount of power supplied from the power station 100 through the receiving coil 220.

The electric devices 201 and 202 may transmit information about the amount of power, which is supplied from the power station 100, to the power station 100 through wireless communication during the idle period Tslot.

The power station 100 may obtain the amount of power received by the electric devices 201 and 202 from the electric devices 201 and 202.

The power station 100 identifies whether the object to which power is to be transmitted is aligned therewith (1360).

The transmission controller 160 may calculate a ratio of the amount of power received by the electric devices 201 and 202 through the receiving coil 220 to the amount of power transmitted from the power station 100 through the transmitting coil 120 (hereinafter referred to as a "power transmission rate") and identify whether the transmitting coil 120 is aligned with the receiving coil 220 based on the power transmission rate.

The power station 100 may calculate the amount of power transmitted to the electric devices 201 and 202 based on an output of the transmission current sensor 141. The transmission current sensor 141 may measure a drive current supplied from the inverter 131 to the transmitting coil 120, and the transmission controller 160 may identify the intensity of a current supplied to the transmitting coil 120 based on an output signal of the transmission current sensor 141, and calculate the amount of power transmitted to the electric devices 201 and 202 through the transmitting coil 120.

The transmission controller 160 may calculate a "power transmission rate" based on a ratio of the amount of power received from the electric devices 201 and 202 to the amount of the transmitted power. For example, the transmission controller 160 may obtain a "power transmission rate" by dividing the amount of the received power by the amount of the transmitted power.

When the transmitting coil 120 is aligned with the receiving coil 220, a linkage magnetic field passing through the receiving coil 220 may increase among magnetic fields generated by the transmitting coil 120. Accordingly, the power transmission rate may increase. Therefore, the transmission controller 160 may identify that the transmitting coil 120 is aligned with the receiving coil 220 when the power transmission rate is greater than a reference transmission rate.

On the other hand, when the transmitting coil 120 is not aligned with the receiving coil 220, a leakage magnetic field passing through the receiving coil 220 may increase among magnetic fields generated by the transmitting coil 120. Accordingly, the power transmission rate may reduce. Therefore, the transmission controller 160 may identify that the transmitting coil 120 is not aligned with the receiving coil 220 when the power transmission rate is less the reference transmission rate.

When it is identified that the power station 100 is not aligned with the object to which power is to be transmitted (No in 1360), the power station 100 stops the transmission of power to the object (1370) and displays the non-alignment with the object (1380).

Operations 1370 and 1380 may be the same as operations 1150 and 1160 of FIG. 13, respectively.

When it is identified that the power station 100 is aligned with the object to which power is to be transmitted (Yes in 1360), the power station 100 continuously transmits power to the object (1390).

Operation 1390 may be the same as operation 1170 illustrated in FIG. 13.

As described above, the power station 100 may calculate a transmission rate of power transmitted to the electric devices 201 and 202 during wireless transmission of power to the electric devices 201 and 202 and identify whether the transmitting coil 120 is aligned with the receiving coil 220 based on the transmission rate. In addition, the power station 100 may stop the transmission of power to the electric devices 201 and 202 and request a user to reposition the electric devices 201 and 202 based on whether the transmitting coil 120 is aligned with the receiving coil 220.

Therefore, the power station 100 may identify non-alignment of the transmitting coil 120 and the receiving coil 220 due to the movement of the electric device 201 and 202 during an operation of the power station 100. The power station 100 may allow the user to reposition the electric devices 201 and 202 such that the transmitting coil 120 is aligned with the receiving coil 220. In addition, the power station 100 may improve the efficiency of power transmission to the electric devices 201 and 202.

Figure 18:
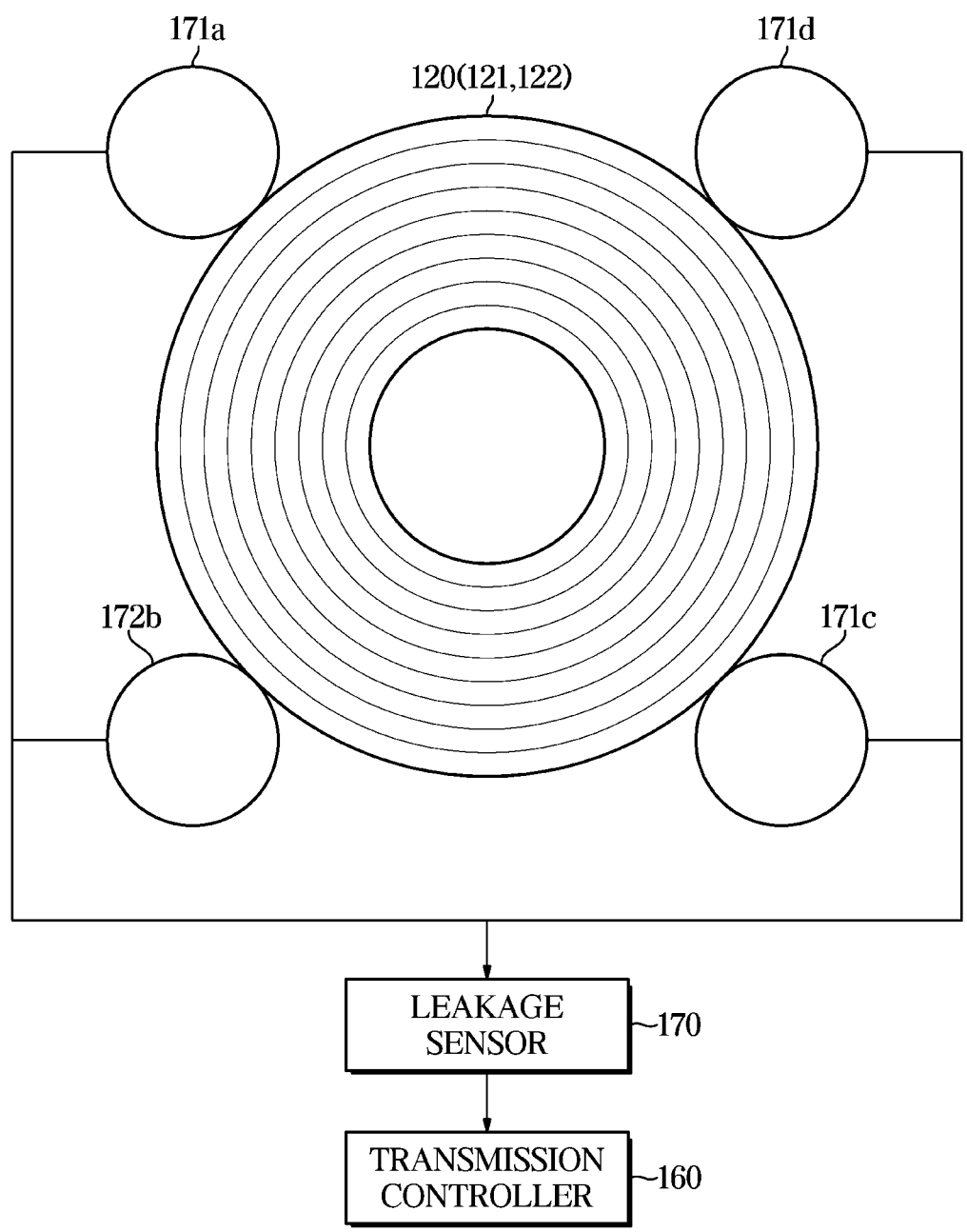
FIG. 18 illustrates an example of an auxiliary coil of a leakage sensor included in a power station according to an embodiment.

FIG. 18 illustrates an example of an auxiliary coil of a leakage sensor included in a power station according to an embodiment.

Although it has been described above that the power station 100 identifies whether the electric devices 201 and 202 are aligned therewith based on reception strength of a communication signal and/or a power transmission rate, a method of identifying whether the electric devices 201 and 202 are aligned with the power station 100 is not limited thereto.

For example, the power station 100 may identify whether the electric devices 201 and 202 are aligned therewith by detecting a leakage magnetic field.

As shown in FIG. 18, auxiliary coils 171a, 171b, 171c, and 171d may be disposed near the transmitting coil 120 to detect a leakage magnetic field. For example, the auxiliary coils 171a, 171b, 171c, and 171d may be disposed on the circumference of a circle surrounding the transmitting coil 120.

The auxiliary coils 171a, 171b, 171c, 171d include a first auxiliary coil 171a, a second auxiliary coil 171b, a third auxiliary coil 171c, and a fourth auxiliary coil 171d, and the first, second, third, and fourth auxiliary coils 171a, 171b, 171c, and 171d may be disposed along the circumference of the circle surrounding the transmitting coil 120.

The first, second, third, and fourth auxiliary antennas 171a, 171b, 171c, and 171d may be arranged at a predetermined angle interval to maximize a distance therebetween. For example, the first, second, third, and fourth auxiliary antennas 171a, 171b, 171c, and 171d may be arranged along the circumference of the circle surrounding the transmitting coil 120 such that an angle interval therebetween is approximately 90 degrees.

The auxiliary coils 171a, 171b, 171c, and 171d arranged along the circumference of the circle surrounding the transmitting coil 120 may detect a magnetic field that is not transmitted from the transmitting coil 120 to the receiving coil 220 and is leaking.

The power station 100 may measure the intensity of a leakage magnetic field through the plurality of auxiliary coils 171a, 171b, 171c, and 171d. The plurality of auxiliary coils 171a, 171b, 171c, and 171d may be connected to the leakage sensor 170, and the leakage sensor 170 may measure the intensity of current induced by a leakage magnetic field detected by the plurality of auxiliary coils 171a, 171b, 171c, and 171d and provide an electrical signal corresponding to the magnitude of the leakage magnetic field to the transmission controller 160.

The transmission controller 160 may identify the magnitude of the leakage magnetic field based on an output signal of the leakage sensor 170, and identify whether the transmitting coil 120 is aligned with the receiving coil 220 based on the magnitude of the leakage magnetic field. When the magnitude of the leakage magnetic field is greater than a reference magnitude, the transmission controller 160 may identify that the transmitting coil 120 is not aligned with the receiving coil 220. When the magnitude of the leakage magnetic field is less than the reference magnitude, the transmission controller 160 may identify that the transmitting coil 120 is aligned with the receiving coil 220.

As described above, by arranging the auxiliary coils 171 (171a, 171b, 171c, and 171d) along the circumference of the circle surrounding the transmitting coil 120, the power station 100 may identify whether the transmitting coil 120 is aligned with the receiving coil 220.

Figure 19:
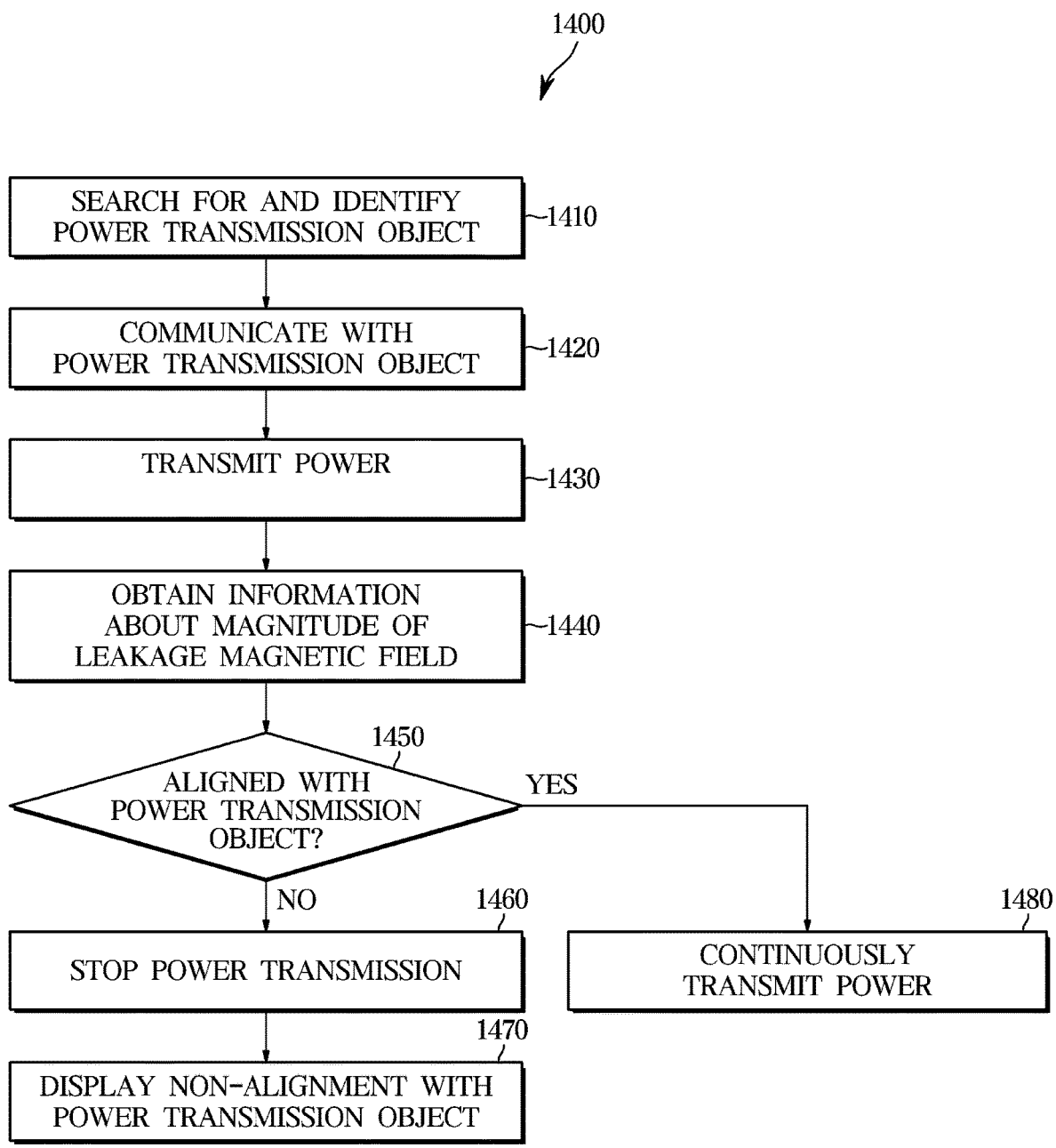
FIG. 19 illustrates an example of identifying whether a power station is aligned with an electric device according to an embodiment.

FIG. 19 illustrates an example of identifying whether a power station is aligned with an electric device according to an embodiment.

An example 1400 of identifying whether the power station 100 is aligned with the electric devices 201 and 202 will be described with reference to FIG. 19 below.

The power station 100 searches for and identifies an object to which power is to be transmitted wirelessly (1410) and attempts to wirelessly communicate with the object (1420).

Operations 1410 and 1420 may be the same as operations 1010 and 1020 of FIG. 10, respectively.

The power station 100 wirelessly transmits power to the object to which power is to be transmitted (1430).

Operation 1430 may be the same as operation 1060 illustrated in FIG. 10.

The power station 100 obtains information about the magnitude of a leakage magnetic field (1440).

The transmission controller 160 may obtain information about the magnitude of the leakage magnetic field through the auxiliary coils 171a, 171b, 171c, 171d and the leakage sensor 170.

The plurality of auxiliary coils 171a, 171b, 171c, and 171d may detect a leakage magnetic field and supply a current induced by the leakage magnetic field to the leakage sensor 170. The leakage sensor 170 may measure the intensity of a current induced by the leakage magnetic field and provide an electrical signal corresponding to the magnitude of the leakage magnetic field to the transmission controller 160.

The transmission controller 160 can identify the magnitude of the leakage magnetic field based on an output signal of the leakage sensor 170.

The power station 100 identifies whether the object to which power is to be transmitted is aligned therewith (1450).

The transmission controller 160 may identify whether the transmitting coil 120 is aligned with the receiving coil 220 based on the magnitude of the leakage magnetic field. When the magnitude of the leakage magnetic field is greater than a reference magnitude, the transmission controller 160 may identify that the transmitting coil 120 is not aligned with the receiving coil 220. When the magnitude of the leakage magnetic field is less than the reference magnitude, the transmission controller 160 may identify that the transmitting coil 120 is aligned with the receiving coil 220.

When it is identified that the power station 100 is not aligned with the object to which power is to be transmitted (No in 1450), the power station 100 stops the transmission of power to the object (1460) and displays the non-alignment with the object (1470).

Operations 1460 and 1470 may be the same as operations 1150 and 1160 of FIG. 13, respectively.

When it is identified that the power station 100 is aligned with the object to which power is to be transmitted (Yes in 1360), the power station 100 continuously transmits power to the object (1480).

Operation 1480 may be the same as operation 1170 illustrated in FIG. 13.

As described above, the power station 100 may detect a leakage magnetic field during wireless transmission of power to the electric devices 201 and 202 and identify whether the transmitting coil 120 is aligned with the receiving coil 220 based on the magnitude of the leakage magnetic field. In addition, the power station 100 may stop the transmission of power to the electric devices 201 and 202 and request a user to reposition the electric devices 201 and 202 based on whether the transmitting coil 120 is aligned with the receiving coil 220.

Therefore, the power station 100 may identify non-alignment of the transmitting coil 120 and the receiving coil 220 due to the movement of the electric device 201 and 202 during an operation of the power station 100. The power station 100 may allow the user to reposition the electric devices 201 and 202 such that the transmitting coil 120 is aligned with the receiving coil 220. In addition, the power station 100 may improve the efficiency of power transmission to the electric devices 201 and 202.

Figure 20:
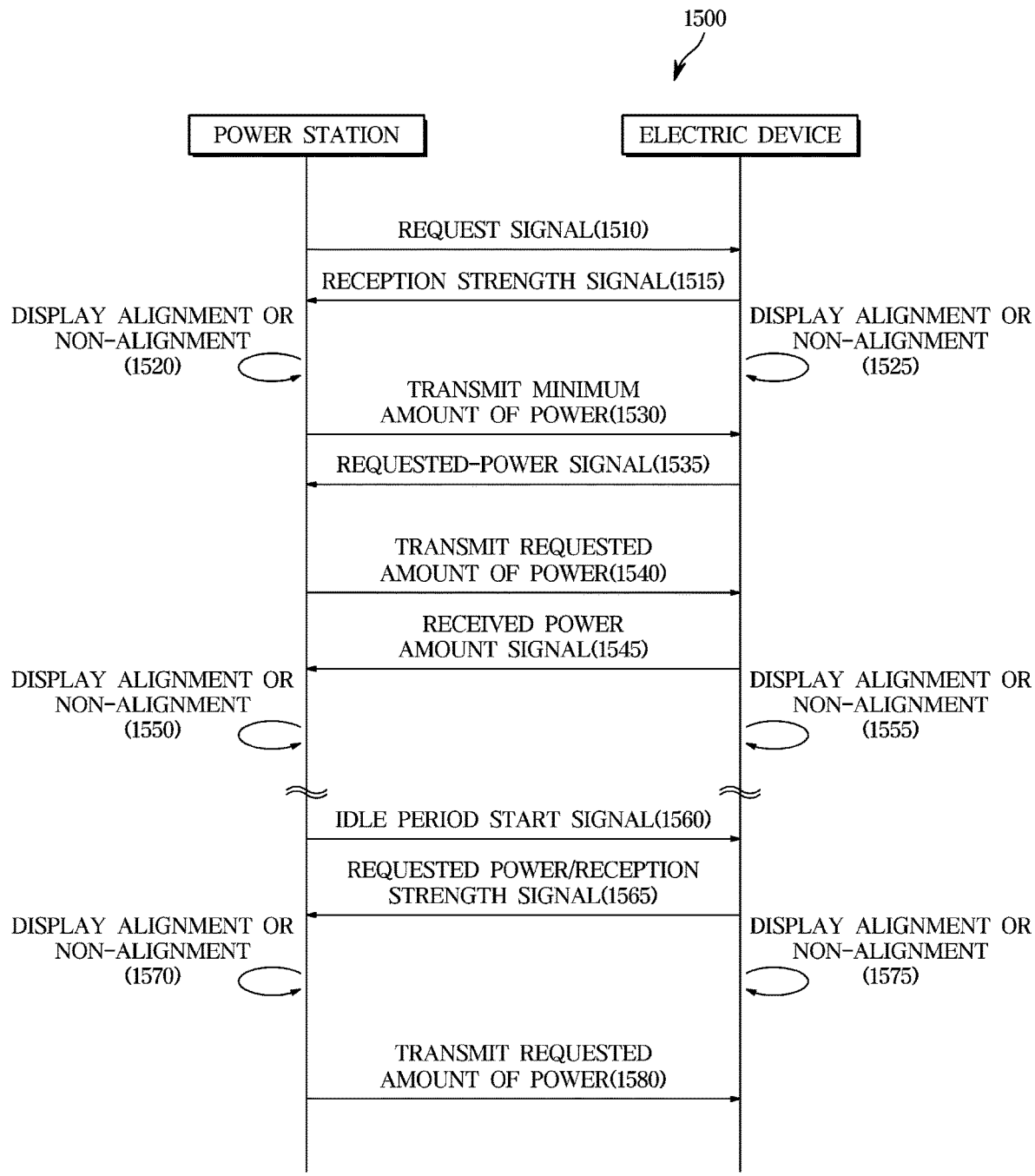
FIG. 20 illustrates an example in which a power station identifies whether coils are aligned with each other, together with electric devices, according to an embodiment.

FIG. 20 illustrates an example in which a power station identifies whether coils are aligned with each other, together with electric devices, according to an embodiment.

An example 1500 in which the power station 100 identifies whether the coils 120 and 220 are aligned with each other together with the electric devices 201 and 202 will be described with reference to FIG. 20 below.

The power station 100 transmits a response request signal to the electric devices 201 and 202 through the first communicator 150 (1510).

The electric devices 201 and 202 transmit a response signal (a reception strength signal) indicating the reception strength of the response request signal from the power station 100 to the power station 100 through the second communicator 260, in response to the response request signal from the power station 100 (1515).

The power station 100 identifies whether the coils 120 and 220 are aligned with each other based on the reception strength signal from the electric devices 201 and 202 and displays whether the coils 120 and 122 are aligned with each other (1520).

The electric devices 201 and 202 identify whether the coils 120 and 220 are aligned with each other based on the reception strength of the response request signal and display whether the coils 120 and 220 are aligned with each other (1525).

The power station 100 transmits a minimum amount of power (e.g., 100 mW to 500 mW) through the transmitting coil 120 (1530).

The electric devices 201 and 202 transmit a requested-power signal indicating a requested amount of power for providing a user with a service to the power station 100 through the second communicator 260 (1535). The electric devices 201 and 202 may activate components to be operated using a minimum amount of power. For example, the electric devices 201 and 202 may activate a user interface and receive a control command from a user.

The power station 100 transmits the required amount of power to the electric devices 201 and 202 through the transmitting coil 120 in response to the requested-power signal from the electric devices 201 and 202 (1540).

The electric devices 201 and 202 transmit a response signal (a received-power amount signal) indicating the amount of received power to the power station 100 through the second communicator 260 (1545). The electric devices 201 and 202 may calculate the amount of power received during wireless receiving of power from the power station 100 and transmit the calculated amount of the received power to the power station 100 through the second communicator 260.

The power station 100 identifies whether the coils 120 and 220 are aligned with each other based on the received-power amount signal from the electric devices 201 and 202 and displays whether the coils 120 and 122 are aligned with each other (1550).

The electric devices 201 and 202 identify whether the coils 120 and 220 are aligned with each other based on the calculated amount of the received power and display whether the coils 120 and 220 are aligned with each other (1555).

The power station 100 transmits an idle period start signal to the electric devices 201 and 202 through the first communicator 150 during an idle period Tslot of an operation thereof (1560).

The electric devices 201 and 202 transmit a reception strength/requested-power signal, which indicates reception strength of the idle period start signal from the power station 100 and the amount of power requested to provide a service to a user, to the power station 100 through second communicator 260 in response to the idle period start signal from the power station 100 (1565).

The power station 100 identifies whether the coils 120 and 220 are aligned with each other based on the reception strength/requested-power signal from the electric devices 201 and 202 and displays whether the coils 120 and 122 are aligned with each other (1570).

The electric devices 201 and 202 identify whether the coils 120 and 220 are aligned with each other based on the reception strength of the idle period start signal, and display whether the coils 120 and 220 are aligned with each other (1575).

The power station 100 transmits the required amount of power to the electric devices 201 and 202 through the transmitting coil 120 in response to the reception strength/requested-power signal from the electric devices 201 and 202 (1580).

As described above, the power station 100 may identify whether the receiving coil 220 is aligned with the transmitting coil 120 based on reception strength of a communication signal received by the electric devices 201 and 202 and/or the amount of power received wirelessly by the electric devices 201 and 202.

Accordingly, the power station 100 may allow a user to reposition the electric devices 201 and 202 such that the transmitting coil 120 is aligned with the receiving coil 220. In addition, the power station 100 may improve the efficiency of power transmission to the electric devices 201 and 202.

Figure 21:
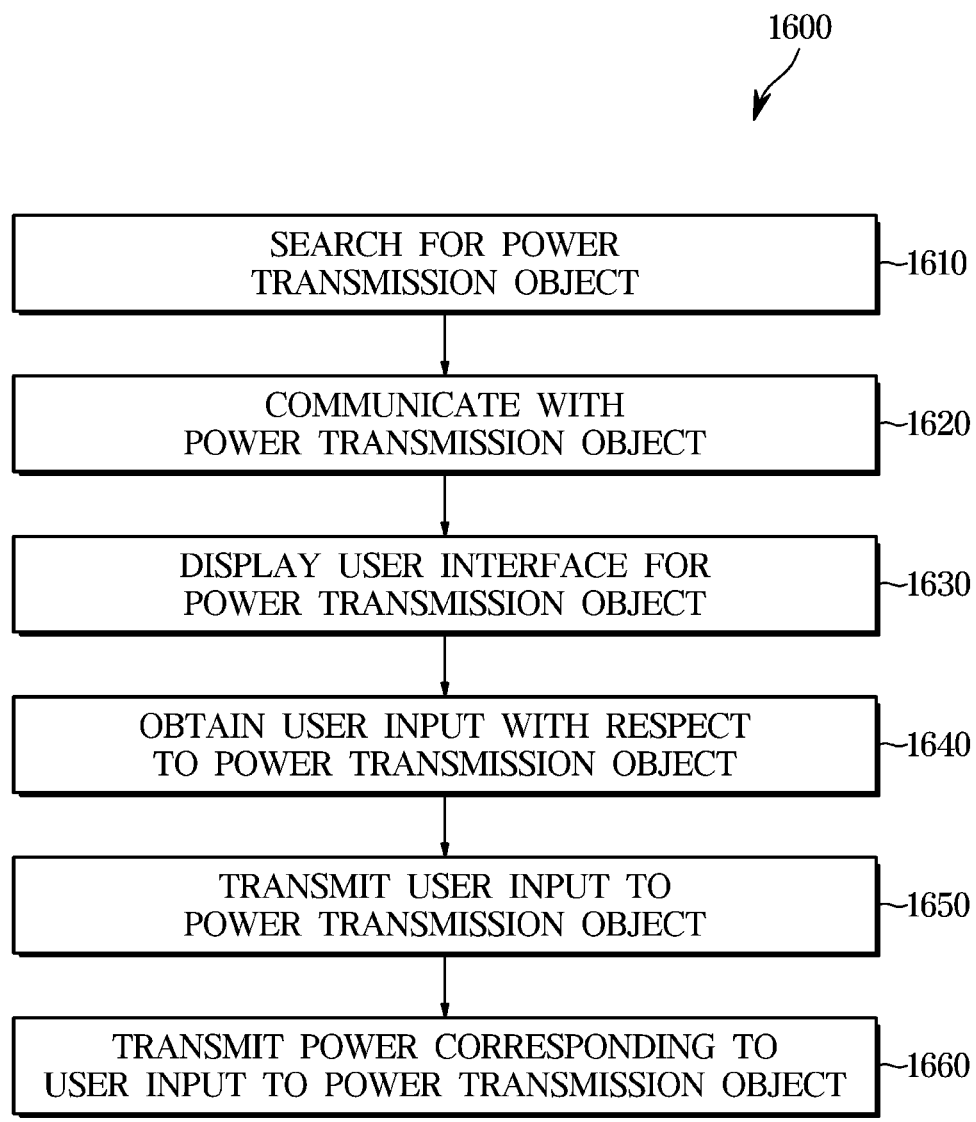
FIG. 21 illustrates an example of controlling an operation of an electric device by a power station according to an embodiment.
Figure 22:
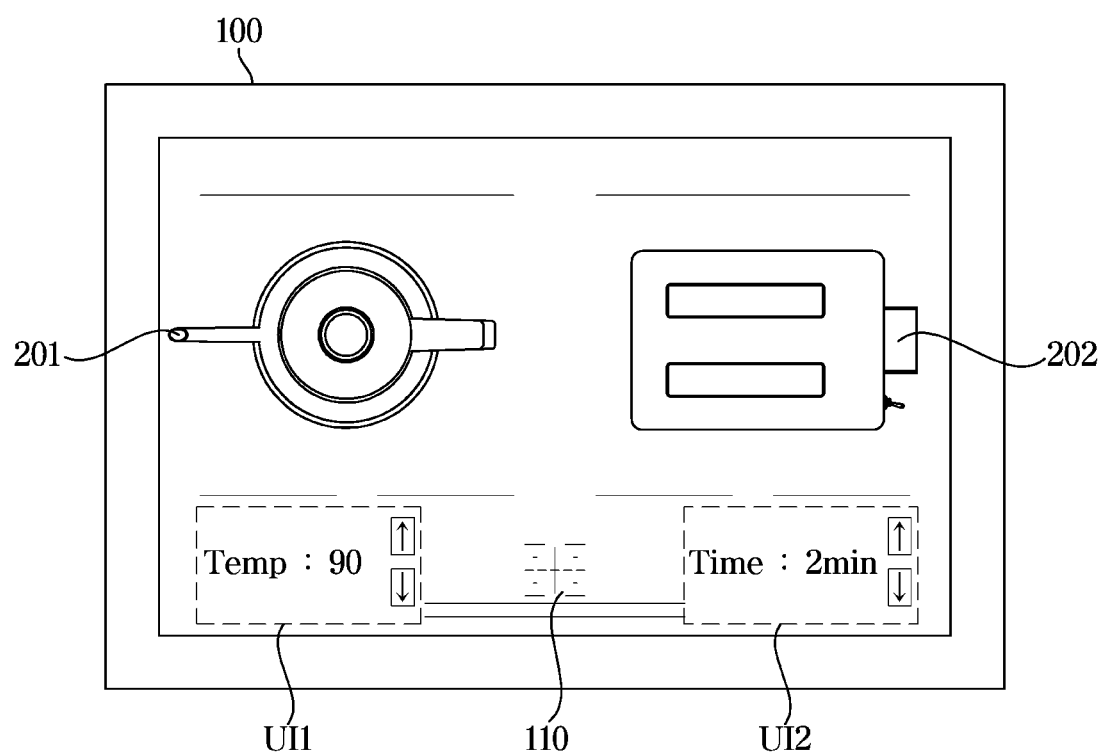
FIG. 22 illustrates an example of displaying a user interface for an electric device by a power station according to an embodiment.

FIG. 21 illustrates an example of controlling an operation of an electric device by a power station according to an embodiment. FIG. 22 illustrates an example of displaying a user interface for an electric device by a power station according to an embodiment.

An example 1600 in which the power station 100 controls the electric devices 201 and 202 in response to a response from a user will be described with reference to FIGS. 21 and 22 below.

The power station 100 searches for and identifies an object to which power is to be transmitted wirelessly (1610) and attempts to wirelessly communicate with the object (1620).

Operations 1210 and 1220 may be the same as operations 1010 and 1020 of FIG. 10, respectively.

The power station 100 displays user interfaces UI1 and UI2 for a power transmission object (1630).

The transmission controller 160 may identify the electric devices 201 and 202 through communication with the electric devices 201 and 202. Specifically, the transmission controller 160 may identify the types, model names, and maximum power consumption rates, etc. of the electric devices 201 and 202.

The user interfaces UI1 and UI2 according to the types, model names, etc. of the electric devices 201 and 202 and the like may be stored in advance in the memory 162 of the transmission controller 160. For example, as shown in FIG. 22, a first user interface UI1 for manipulating an electric kettle 201 and a second user interface UI2 for manipulating a toaster 202 may be stored in the transmission controller 160.

The first user interface UI1 may include a display displaying a target temperature of water contained in the electric kettle 201, a button to raise the target temperature, a button for lowering the target temperature, and the like. The second user interface UI2 may include a display displaying a target time for operating the toaster 202, a button to increase the target time, a button for reducing the target time, and the like.

The transmission controller 160 may control the display 112 to display the user interfaces UI1 and UI2 corresponding to the identified electric devices 201 and 202. In this case, the display 112 may include a touch screen panel.

The power station 100 obtains a user input for the power transmission object (1640).

The transmission controller 160 may obtain a user input with respect to the electric devices 201 and 202 through the user interfaces UI1 and UI2 displayed on the touch screen panel. For example, the transmission controller 160 may obtain a target temperature of the electric kettle 201 through the first user interface UI1 or obtain a target time of the toaster 202 through the second user interface UI2.

The power station 100 transmits the obtained user input to the power transmission object (1650).

The transmission controller 160 may control the first communicator 150 to transmit the user input obtained through the user interfaces UI1 and UI2 to the electric devices 201 and 202. For example, the transmission controller 160 may control the short-range communication module 153 to transmit information about the target temperature obtained through the first user interface UI1 to the electric kettle 201 and to transmit information about the target time obtained through the second user interface UI2 to the toaster 202.

The power station 100 transmits power corresponding to the obtained user input to the power transmission object (1660).

The transmission controller 160 may control the driver 130 to transmit power corresponding to the user input obtained through the user interfaces UI1 and UI2.

For example, the transmission controller 160 may stop the transmission of power to the electric kettle 201 in response to a message indicating that a temperature of water contained in the electric kettle 201 reaches the target temperature during an idle period Tslot of power transmission. The transmission controller 160 may stop the transmission of power to the toaster 202 in response to the reaching of a time, during which the power is transmitted to the toaster 202, of the target time.

As another example, the transmission controller 160 may control the driver 130 to transmit power according to the intensity of an output of an electric device according to a user input. For example, the transmission controller 160 may control the driver 130 to adjust the amount of power to be transmitted to an electric fan according to an output of the electric fan in response to a user input for adjusting the output of the electric fan (e.g., high, middle or low power), received through a user interface.

As described above, the power station 100 may display a user interface for the electric devices 201 and 202, obtain a user input with respect to a power transmission objects through the user interface, and transmit the user input to electric devices 201 and 202. In other words, a user may control the electric devices 201 and 202 through the power station 100.

Accordingly, the user may control both the electric devices 201 and 202 through the power station 100. Because the user may control the electric devices 201 and 202 through the power station 100, a control panel and the like of each of the electric devices 201 and 202 may be omitted.

A power station includes a plate, a coil below the plate, an inverter configured to supply an alternating current to the coil, a communication module including an antenna and configured to transmit and receive radio signals through the antenna, a display, and a controller configured to control the communication module to communicate with an external device placed on the plate and control the inverter to wirelessly transmit power to the external device through the coil. The controller may control the display to display information indicating whether the external device is aligned with the coil based on a radio signal received from the external device through the antenna.

The controller may identify whether the external device is aligned with the coil based on the radio signal received from the external device through the antenna, control the display to indicate non-alignment with the external device based on identifying that the external device is not aligned with the coil, and control the inverter to wirelessly supply power to the external device through the coil based on identifying that the external device is aligned with the coil.

As described above, the power station may identify whether the external device is aligned with the coil before an operation and guide a user to move the external device when the external device is not aligned with the coil. Accordingly, the efficiency of power transmission of the external device from the power station can be improved.

The controller may control the inverter to wirelessly supply power to the external device through the coil during a transmission period and identify whether the external device is aligned with the coil during an idle period based on a radio signal received from the external device through the antenna.

As described above, the power station may identify whether the external device is aligned with the coil during an operation and guide a user to move the external device when the external device is not aligned with the coil. Accordingly, the power station is capable of transmitting power to the external device with improved efficiency even when the external device is moving during the operation of the power station.

The controller may identify whether the external device is aligned with the coil based on the reception strength of the external device, which is included in a radio signal received from the external device or based on the reception strength of the radio signal received from the external device.

As described above, the power station may identify whether the external device is aligned with the coil based on the reception strength of a signal during communication with the external device. Accordingly, the power station may guide the external device to be aligned with the coil before an operation.

The controller may control the inverter to supply an alternating current with an envelope having a sine wave form to the coil and identify whether the external device is aligned with the coil based on a radio signal received from the external device through the antenna for a time interval during that the envelope having the sine wave form is approximately "0."

Therefore, during an operation, the power station may communicate with the external device without causing a sharp fluctuation of power transmission and identify whether the external device is aligned with the coil.

The antenna has a circular shape provided at an outer side of the coil to surround the coil, and the center of the antenna may roughly coincide with the center of the coil.

Accordingly, the efficiency of power transmission between the power station and the external device can be improved.

The antenna may include a plurality of antennas arranged at an outer side of the coil and along the circumference of a virtual circle surrounding the coil, the plurality of antennas may be spaced substantially the same distance from each other, and the controller may identify whether the external device is aligned with the coil based on the reception strength of a radio signal received from the external device.

Therefore, the power station may guide a user to a direction in which the external device is to be moved so as to be aligned with the coil.

The embodiments set forth herein have been described above with reference to the accompanying drawings. It will be understood by those of ordinary skill in the technical field to which the embodiments set forth herein pertain that the present disclosure may be implemented in different forms than those of these embodiments without departing from the technical idea or essential features of the embodiments. The embodiments set forth herein are only examples and should not be interpreted in a restrictive manner.

Although the present disclosure has been described with various embodiments, various changes and modifications may be suggested to one skilled in the art. It is intended that the present disclosure encompass such changes and modifications as fall within the scope of the appended claims.

What is claimed is:

1. A power station comprising:
a plate;
a coil below the plate;
an inverter configured to supply alternating current power to the coil;
a communication module including an antenna, the antenna further comprising a plurality of auxiliary antennas arranged at an outer side of the coil and along a circumference of a virtual circle surrounding the coil and spaced substantially a same distance from each other along the circumference of the virtual circle, and the communication module configured to transmit and receive radio signals through the antenna;
a display; and
a controller configured to:
control the communication module to communicate with an external device placed on the plate,
identify whether the external device is aligned with the coil based on a reception strength of a radio signal received from the external device through the plurality of auxiliary antennas,
control the inverter to wirelessly supply power to the external device through the coil, and
control the display to display information indicating whether the external device is aligned with the coil based on the radio signal received from the external device.

2. The power station of claim 1, wherein the controller is configured to
control the display to indicate non-alignment with the external device based on identifying that the external device is not aligned with the coil.

3. The power station of claim 1, wherein the controller is configured to
control the inverter to wirelessly supply power to the external device through the coil based on identifying that the external device is aligned with the coil.

4. The power station of claim 1, wherein the controller is configured to:
control the inverter to wirelessly supply power to the external device through the coil during a transmission period, and
identify whether the external device is aligned with the coil during an idle period based on the radio signal received from the external device through the antenna.

5. The power station of claim 1, wherein the controller is configured to identify whether the external device is aligned with the coil based on a reception strength of the external device that is included in the radio signal received from the external device.

6. The power station of claim 1, wherein the controller is configured to:
control the inverter to supply an alternating current with an envelope having a sine wave form to the coil, and
identify whether the external device is aligned with the coil based on the radio signal received from the external device through the antenna for a time interval during that the envelope having the sine wave form is approximately "0".

7. The power station of claim 1, wherein the controller is configured to control the display to display a direction in which the external device is to be moved to align with the coil based on reception strength of radio signals received through the plurality of auxiliary antennas.

8. A control method of a power station including a plate and a coil below the plate, the control method comprising:
communicating, using a communication module of the power station including an antenna, the antenna further comprising a plurality of auxiliary antennas arranged at an outer side of the coil and along a circumference of a virtual circle surrounding the coil and spaced substantially a same distance from each other along the circumference of the virtual circle, to transmit and receive radio signals, with an external device placed on the plate;
identifying whether the external device is aligned with the coil based on a reception strength of a radio signal received from the external device through the plurality of auxiliary antennas;
displaying, using a display of the power station, whether the external device is aligned with the coil based on the radio signal received from the external device; and
wirelessly supplying, using an inverter of the power station, alternating current power to the external device through the coil.

9. The control method of claim 8, wherein the displaying of whether the external device is aligned with the coil comprises displaying non-alignment with the external device based on identifying that the external device is not aligned with the coil.

10. The control method of claim 8, wherein the wirelessly supplying of the alternating current power to the external device through the coil comprises wirelessly supplying the alternating current power to the external device through the coil based on identifying that the external device is aligned with the coil.

11. The control method of claim 8, wherein the wirelessly supplying of the alternating current power to the external device through the coil comprises:
wirelessly supplying the alternating current power to the external device through the coil during a transmission period; and
identifying whether the external device is aligned with the coil during an idle period based on the radio signal received from the external device through the antenna.

12. The control method of claim 11, wherein the displaying of whether the external device is aligned with the coil comprises identifying whether the external device is aligned with the coil based on a reception strength of the external device that is included in the radio signal received from the external device.

13. A power station comprising:
a plate;
a coil below the plate;
an inverter configured to supply alternating current power to the coil;
a communication module including an antenna, the antenna further comprising a plurality of auxiliary antennas arranged at an outer side of the coil and along a circumference of a virtual circle surrounding the coil and spaced substantially a same distance from each other along the circumference of the virtual circle, and the communication module configured to transmit and receive radio signals through the antenna;
a display; and
a controller configured to:

control the communication module to communicate with an external device placed on the plate, identify whether the external device is aligned with the coil based on an amount of power received from the external device through the plurality of auxiliary antennas, control the inverter to wirelessly supply power to the external device through the coil, and control the display to display information indicating whether the external device is aligned with the coil based on an amount of power received by the external device and identifying that the external device is not aligned with the coil.

14. The power station of claim 13, wherein the controller is configured to control the inverter to wirelessly supply power to the external device through the coil based on identifying that the external device is aligned with the coil.

15. The power station of claim 13, wherein the controller is configured to:

control the inverter to wirelessly supply power to the external device through the coil during a transmission period, and identify whether the external device is aligned with the coil during an idle period based on the radio signal received from the external device through the antenna.

* * * * *